US007070755B2

(12) United States Patent
Klett et al.

(10) Patent No.: US 7,070,755 B2
(45) Date of Patent: Jul. 4, 2006

(54) PITCH-BASED CARBON FOAM AND COMPOSITES AND USE THEREOF

(75) Inventors: James W. Klett, Knoxville, TN (US); Timothy D. Burchell, Oak Ridge, TN (US); Ashok Choudhury, Oak Ridge, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 431 days.

(21) Appl. No.: 10/059,648

(22) Filed: Jan. 29, 2002

(65) Prior Publication Data

US 2002/0141932 A1  Oct. 3, 2002

Related U.S. Application Data

(60) Division of application No. 09/519,559, filed on Mar. 6, 2000, and a continuation-in-part of application No. 09/136,596, filed on Aug. 19, 1998, now Pat. No. 6,387,343, which is a division of application No. 08/921,875, filed on Sep. 2, 1997, now Pat. No. 6,033,506, application No. 10/059,648, which is a continuation-in-part of application No. 09/458,640, filed on Dec. 9, 1999, which is a continuation-in-part of application No. 09/093,406, filed on Jun. 8, 1998, now Pat. No. 6,037,032, which is a continuation-in-part of application No. 08/923,877, filed on Sep. 2, 1997, now abandoned, application No. 10/059,648, which is a continuation-in-part of application No. 08/921,875, filed on Sep. 2, 1997, now Pat. No. 6,033,506, and a continuation-in-part of application No. 09/093,406, filed on Jun. 8, 1998, now Pat. No. 6,037,032, which is a division of application No. 08/923,877, filed on Sep. 2, 1997, now abandoned.

(51) Int. Cl.
*C01B 31/04* (2006.01)

(52) U.S. Cl. .................................................. 423/448

(58) Field of Classification Search ................ 423/448
See application file for complete search history.

(56) References Cited

U.S. PATENT DOCUMENTS

| | | | |
|---|---|---|---|
| 2,401,797 A | 6/1946 | Rasmussen | 210/150.5 |
| 3,306,353 A | 2/1967 | Burne | 165/164 |
| 3,453,809 A | 7/1969 | Henderson | 55/269 |
| 3,558,276 A | 1/1971 | Otani et al. | 23/209.1 |
| 3,784,487 A | 1/1974 | Franck et al. | 260/2.5 F |
| 3,914,392 A | 10/1975 | Klett | 264/29 |
| 3,973,718 A | 8/1976 | Deschamps | 228/183 |
| 3,979,196 A | 9/1976 | Frank et al. | 65/25 |
| 4,005,183 A | 1/1977 | Singer | 423/447.2 |
| 4,007,324 A | 2/1977 | Wallouch | 13/18 |
| 4,025,689 A | 5/1977 | Kobayashi et al. | 428/402 |
| 4,057,101 A | 11/1977 | Ruka et al. | 165/1 |
| 4,096,097 A | 6/1978 | Yan | 252/510 |
| 4,125,676 A | 11/1978 | Maricle et al. | 429/38 |
| 4,205,055 A | 5/1980 | Maire et al. | 423/445 |
| 4,225,463 A | 9/1980 | Unger et al. | 252/445 |
| 4,272,356 A | 6/1981 | Stiller et al. | 208/8 LE |
| 4,276,246 A | 6/1981 | Bonzom et al. | 264/53 |
| 4,303,431 A | 12/1981 | Torobin | 65/21.4 |
| 4,311,682 A | 1/1982 | Miyazaki et al. | 423/448 |
| 4,318,824 A | 3/1982 | Turner | 252/421 |
| 4,439,349 A | 3/1984 | Everett et al. | 502/180 |
| 4,442,165 A | 4/1984 | Gebhardt et al. | 428/307.7 |
| 4,487,687 A | 12/1984 | Simo et al. | 208/56 |
| 4,512,388 A | 4/1985 | Claar et al. | 165/1 |
| 4,518,483 A | 5/1985 | Dickakian | 208/44 |
| 4,525,492 A | 6/1985 | Rastall et al. | 521/181 |
| 4,550,015 A | 10/1985 | Korb et al. | 423/445 |
| 4,572,864 A | 2/1986 | Benson et al. | 428/305.5 |
| 4,605,595 A | 8/1986 | Tsang et al. | 428/413 |
| RE32,319 E | 12/1986 | Korb et al. | 423/445 |
| 4,637,906 A | 1/1987 | Fukuda et al. | 264/29.1 |
| 4,659,624 A | 4/1987 | Yeager et al. | 428/408 |
| 4,775,655 A | 10/1988 | Edwards et al. | 502/416 |
| 4,782,586 A | 11/1988 | Joo et al. | 29/623.5 |

(Continued)

FOREIGN PATENT DOCUMENTS

FR    2411811    7/1979

(Continued)

OTHER PUBLICATIONS

Klett, J. and Edie, D., Flexible Towpreg for the Fabrication of High Thermal Conductivity Carbon/Carbon Composities, *Carbon*, 33:10, pp. 1485-1503.

(Continued)

*Primary Examiner*—Stuart Hendrickson
(74) *Attorney, Agent, or Firm*—Akerman Senterfitt

(57) ABSTRACT

A thermally conductive carbon foam is provided, normally having a thermal conductivity of at least 40 W/m·K. The carbon foam usually has a specific thermal conductivity, defined as the thermal conductivity divided by the density, of at least about 75 W·cm$^3$/m·° K·gm. The foam also has a high specific surface area, typically at least about 6,000 m$^2$/m$^3$. The foam is characterized by an x-ray diffraction pattern having "doublet" 100 and 101 peaks characterized by a relative peak split factor no greater than about 0.470. The foam is graphitic and exhibits substantially isotropic thermal conductivity. The foam comprises substantially ellipsoidal pores and the mean pore diameter of such pores is preferably no greater than about 340 microns. Other materials, such as phase change materials, can be impregnated in the pores in order to impart beneficial thermal properties to the foam. Heat exchange devices and evaporatively cooled heat sinks utilizing the foams are also disclosed.

19 Claims, 23 Drawing Sheets

U.S. PATENT DOCUMENTS

| | | | | |
|---|---|---|---|---|
| 4,806,290 | A | 2/1989 | Hopper et al. | 264/28 |
| 4,832,881 | A | 5/1989 | Arnold, Jr. et al. | 264/29.7 |
| 4,873,071 | A | 10/1989 | Yamada et al. | 423/448 |
| 4,873,218 | A | 10/1989 | Pekala | 502/418 |
| 4,892,783 | A | 1/1990 | Brazel | 428/282 |
| 4,917,835 | A | 4/1990 | Lear et al. | 264/29.1 |
| 4,934,657 | A | 6/1990 | Dodson | 251/214 |
| 4,978,649 | A | 12/1990 | Surovikin et al. | 502/416 |
| 4,992,254 | A | 2/1991 | Kong | 423/449 |
| 4,999,385 | A | 3/1991 | McCullough, Jr. et al. | 521/149 |
| 5,019,164 | A | 5/1991 | Tomita et al. | 106/22 |
| 5,047,225 | A | 9/1991 | Kong | 423/447.2 |
| 5,053,148 | A | 10/1991 | von Bonin | 252/8.05 |
| 5,071,631 | A | 12/1991 | Takabatake | 423/445 |
| 5,076,845 | A | 12/1991 | Seo et al. | 106/284.4 |
| 5,114,635 | A | 5/1992 | Sohda et al. | 264/29.2 |
| 5,138,832 | A | 8/1992 | Pande | 60/203.1 |
| 5,217,701 | A | 6/1993 | Sakata et al. | 423/447.1 |
| 5,232,772 | A | 8/1993 | Kong | 428/312.2 |
| 5,248,705 | A | 9/1993 | McGuigan et al. | 521/149 |
| 5,300,272 | A | 4/1994 | Simandl et al. | 423/445 R |
| 5,384,193 | A | 1/1995 | Suh et al. | 428/375 |
| 5,437,927 | A | 8/1995 | Ross et al. | 428/367 |
| 5,487,946 | A | 1/1996 | McGinniss et al. | 428/413 |
| 5,540,903 | A | 7/1996 | Romine | 423/445 R |
| 5,556,892 | A | 9/1996 | Pekala | 521/181 |
| 5,578,255 | A | 11/1996 | Okuyama et al. | 264/29.5 |
| 5,580,500 | A | 12/1996 | Muramatsu et al. | 264/29.1 |
| 5,582,781 | A | 12/1996 | Hayward | 264/28 |
| 5,614,134 | A | 3/1997 | Sohda et al. | 264/29.1 |
| 5,695,816 | A | 12/1997 | Iwashita et al. | 427/228 |
| 5,705,106 | A | 1/1998 | Kolesnikov et al. | 264/29.1 |
| 5,709,914 | A | 1/1998 | Hayes | 428/35.1 |
| 5,733,484 | A | 3/1998 | Uchida et al. | 264/29.1 |
| 5,770,127 | A | 6/1998 | Abrams et al. | 264/29.1 |
| 5,868,974 | A | 2/1999 | Kearns | 264/29.6 |
| 5,882,621 | A | 3/1999 | Doddapaneni et al. | 423/445 |
| 5,888,430 | A | 3/1999 | Wakayama et al. | 252/503 |
| 5,888,469 | A | 3/1999 | Stiller et al. | 423/445 R |
| 5,902,562 | A | 5/1999 | Lagasse et al. | 423/445 |
| 5,945,084 | A | 8/1999 | Droege | 423/447.4 |
| 5,954,937 | A | 9/1999 | Farmer | 205/687 |
| 6,013,371 | A | 1/2000 | Hager et al. | 428/408 |
| 6,033,506 | A | 3/2000 | Klett | 156/78 |
| 6,037,032 | A | 3/2000 | Klett et al. | 428/71 |
| 6,077,464 | A | 6/2000 | Murdie et al. | 264/29.5 |
| 6,126,874 | A | 10/2000 | Dillon et al. | 264/29.7 |
| 6,142,222 | A | 11/2000 | Kang et al. | 165/148 |
| 6,176,268 | B1 | 1/2001 | Hsich et al. | 138/137 |
| 6,241,957 | B1 * | 6/2001 | Stiller et al. | 423/448 |

FOREIGN PATENT DOCUMENTS

| | | |
|---|---|---|
| JP | 408048509 A | 2/1996 |
| WO | WO9827023 | 6/1998 |
| WO | WO 9911585 | 3/1999 |
| WO | WO 9911586 | 3/1999 |
| WO | WO 9964223 | 12/1999 |

OTHER PUBLICATIONS

Hexcel Product Data Sheet (1997).
Kearns, K., Graphitic Carbon Foam Processing, 21$^{st}$ Annual Conference on Composites, Materials, and Structures, Jan. 26-31, 1997, Cocoa Beach, FL, pp. 835-847 (1997).
Lake, M.L., "Simple Process Produces High Modulus Carbon Fibers at Much Lower Cost," *Mat. Tech.* 11(4): 137-139 (1996).
Jones, S.P., Fain, C.C. and Edie, D.D., "Structural Development in Mosephase Pitch Based Carbon Fibers Produced from Naphthalene," 35(10): 1533-1543 (1997).

Amoco Product Literature (1997).
Steiner, K.V. et al., "Production and Properties of Ultra-Lightweight Aluminum Foams for Industrial Applications," Proceeding from the 4$^{th}$ International Conference on Composites Engineering, Edited by David Hul, pp. 943-944 (1997).
Inoue, K., "Application of Laser Flash Method To Penetrative Materials for Measurement of Thermal Diffusivity," *High Temp. Tech.* 8(1): 21-26 (1990).
Ohihorst, C.W. et al., "Thermal Conductivity Database of Various Structural Carbon-Carbon Composite Materials," NASA Technical Memorandum 4787 (Nov. 1997).
Mehta, R. et al., "Graphitic Carbon Foams: Processing and Characterization," 21$^{st}$ Biennial Conference on Carbon, Conf. Proceedings, American Carbon Society, Buffalo, New York, pp. 104-105 (1993).
Cowan, R.D., "Pulse Method of Measuring Thermal Diffusivity at High Temperatures," J. of App. Phys., 34(4), pp. 926-927 (1962).
*Introduction to Carbon Science*, ed. Harry Marsh, Butterworths and Co., Ltd., London, pp. 6-16, 39-44, 47-49, 51-52, 55-58, 61 and 109 (1989).
Brooks and Taylor, "The Formation of Graphitizing Carbons from the Liquid Phase," Carbon, 3(2),pp. 185-193 (1965).
Rouzaud, J.N. and Oberlin, A., "Structure, Microtexture and Opitcal Properties of Anthracene and Saccharose-Based Carbons," Carbon, 27(4), pp. 517-529 (1989).
Rand, B., "Matrix Precursors for Carbon-Carbon Composites," in *Essentials of Carbon-Carbon Composites*, edited by C.R. Thomas, Royal Society of Chemistry, London pp. 67-102 (1993).
Kelly, B.T., "The Thermal Conductivity of Graphite," *Physics and Chemistry of Carbon*, 5, pp. 119-215 (1969).
Adams, P.M, Katzman, H.A. and Rellick, G.S., "Microstructural and X-Ray Diffraction Studies of Carbon/Carbon Composites for Thermal Management Applications," Aerospace Report No. ATR-98-(8565)-1, Naval Surface Warfare Center Carderock Division, Contract No. FO4701-93-C-0094, Mar. 1, 1998.
Ultramet Product Literature, 1998 (for Ultrafoam,).
Japan Patent Publication No. 04163319, published Jun. 8, 1992 (one page English abstract from European Patent Office).
Klett, J. and Edie, D., "Flexible Towpreg for the Fabrication of High Thermal Conductivity Carbon/Carbon Composities," URL:http://www.ms.ornl.gov/cimtech/cfcms/towpreg.html. Last updated Apr. 14, 1996.
I. Mochida, Y. Korai, K. Shimizu, S. Yoon & R. Fujtura, Preparation, Structure and Application of Monophase Pitches Prepared from Aromatic Hydrocarbons Using HF/BF3 as Catalysts, Tanso, 1992, p. 370-378, No. 155.
R. Fujiura, T. Kojima, K. Kanno, I. Mochida & Y. Korai, Evaluation of Naphthalene-Derived Mesophase Pitches as a Binder for Carbon-Carbon Composites, Carbon, 1993, p. 97-102, vol. 31, No. 1.
XP-002080696—Patent Abstracts of Japan, vol. 014, No. 386 (C-0750), Aug. 21, 1990 and JP 02 142891 A (Kawasaki Steel Corp.), May 31, 1990.
Shih, Wei, "Development of Carbon-Carbon Composites for Electronic Thermal Management Applications," IDA Workshop, May 3-5, 1994, pp. III-119-III-136.
Engle, G.B., A.R. Phillips Laboratory Contract No. F29601-93-C-0165, "High Thermal Conductivity C/C Composites for Thermal Management," IDA Workshop, May 3-5, 1994, pp. III-137-III-148.

Hager, Joseph W. and Lake, Max L., "Novel Hybrid Composites Based on Carbon Foams," Mat. Res. Soc. Symp., Materials Research Society, 270:29-34 (1992).

Sandhu, S.S. and Hager, J.W., "Formulation of a Mathematical Process Model for the Foaming of a Mesophase Carbon Precursor," Mat. Res. Soc. Symp., Materials Research Society, 270:35-40 (1992).

Gibson, L.J. and Ashby, M.F., "Cellular Solids: Structure & Properties," pp. 1-277, Pergamon Press, New York (1988).

Gibson, L.J., "Modeling the Mechanical Behavior of Cellular Materials," Mat. Sci. and Eng. A110, pp. 1-36 (1989).

Knippenberg, W.F. and Lersmacher, B., "Carbon Foam," Phillips Tech. Rev. 36, pp. 93-103 (1976), No. 4.

White, J.L. and Sheaffer, P.M., "Pitch-Based Processing of Carbon-Carbon Composites," Carbon, 27: pp. 697-707 (1989).

Hager, Joseph W., "Idealized Strut Geometries for Open-Celled Foams," Mat. Res. Soc. Symp., Materials Research Society, 270:41-46 (1992).

Aubert, J.H., MRS Symposium Proceedings, "Microcellular Foams Prepared from Demixed Polymer Solutions," 207:117-127 (1991).

Cowlard, F.C. and Lewis, J.C., "Vitreous Carbon—A New Form of Carbon," J. of Mat. Sci. 2:507-512 (1967).

Noda, T., Inagaki, M. and Yamada, S. "Glass-Like Carbons," J. of Non-Crystalline Solids, 1:285-302 (1969).

Davies, G.J. and Zhen, Shu "Review: Metallic Foams: Their Production, Properties and Applications," J. of Mat. Sci. 18: pp. 1899-1911 (1983).

Hager, J., et al., "Idealized Ligament Formation and Geometry in Open-Celled Foams," 21st Bienniel Conference on Carbon Extended Abstracts, p. 102 (1993).

Hager, J., et al., "Progress in Open-Celled Carbon Foams," 40th International Sampe Symposium, Anaheim, CA (May 8-11, 1995).

Edie, D.O., "Pitch and Mesophase Fibers", pp. 1-30 (1990) (from *Carbon Fibers and Filaments*, J.L. Figueiredo, Ed., Kluwer Academic Publishers).

Klett, J., "High Thermal Conductivity, Mesophase Pitch-Derived Carbon Foam," Proceedings of the 1998 43rd Int'l SAMPE Symposium and Exhibition, Part 1 of 2, Anaheim, CA, 43:1, pp. 745-755 (May 31-Jun. 4, 1998).

Anderson, H.J., Anderson, D.P., Kearns, K.M., "Microcellular Pitch-Based Carbon Foams Blown with Helium Gas," Proceedings of the 1998 43rd Int'l SAMPE Symposium and Exhibition, Part 1 of 2, Anaheim, CA, 43:1, pp. 756-762 (May 31-Jun. 4, 1998).

Klett, J.W., Burchell, T.D., "High Thermal Conductivity, Mesophase Pitch Derived Carbon Foam," *Science and Technology of Carbon*, Extended Abstracts and Programme, Eurocarbon, vol. II, Strasbourg, France (Jul. 5-9, 1998).

Klett, J.W., Walls, C., Burchell, T., "High Thermal Conductivity Mesophase Pitch-Derived Carbon Foams: Effect of Precursor on Structure and Properties," Carbon '99, 24th Biennial Conference on Carbon (Jul. 11-16, 1999).

Klett, J.W., "High Thermal Conductivity, Mesophase Pitch-Derived Graphitic Foams," *J. Composites in Mfg.*, 15:4, pp. 1-7.

"Poco Graphite Foam Update 1," pages published at the website of Poco Graphite, Inc., of Decatur, Texas at poco.com/pocofoam/grafpod.com, as downloaded on Jan. 21, 2000.

* cited by examiner

FOAM PRODUCED IN BOTTOM OF SODA CAN.

FOAM PRODUCED IN ALUMINUM WEIGHING DISH.

FOAM REMOVED FROM ALUMINUM WEIGHING DISH AND TURNED OVER, EXPOSING SMOOTH INTEGRATED SURFACE (FACE)

Figure 1. Thermal conductivity as a function of density for ARA24 mesophase derived graphite foam graphitized at 4°C/min and 10°C/min.

Figure 1. Thermal conductivity as a function of density for Conoco mesophase derived graphite foam graphitized at 10°C/min.

PITCH-BASED CARBON FOAM AND COMPOSITES AND USE THEREOF

CROSS REFERENCE TO RELATED APPLICATIONS

This application (1) is a divisional application of U.S. patent application Ser. No. 09/519,559 filed Mar. 6, 2000, which is incorporated by reference, and (2) is a continuation-in-part of U.S. application Ser. No. 09/136,596 filed Aug. 19, 1998 now U.S. Pat. No. 6,387,343 which is a divisional of U.S. application Ser. No. 08/921,875 filed Sep. 2, 1997, now U.S. Pat. No. 6,033,506; and (3) a continuation-in-part of U.S. application Ser. No. 09/458,640 filed Dec. 9, 1999, which itself is a continuation-in-part of U.S. application Ser. No. 09/093,406 filed Jun. 8, 1998, now U.S. Pat. No. 6,037,032, which itself is a continuation-in-part of both U.S. application Ser. No. 08/923,877 filed Sep. 2, 1997, abandoned, and U.S. application Ser. No. 08/921,875 filed Sep. 2, 1997, now U.S. Pat. No. 6,033,506; and (4) a continuation-in-part of U.S. application Ser. No. 09/093,406 filed Jun. 8, 1998, now U.S. Pat. No. 6,037,032, which itself is a continuation-in-part of both U.S. application Ser. No. 08/923,877 filed Sep. 2, 1997, abandoned, and U.S. application Ser. No. 08/921,875 filed Sep. 2, 1997, now U.S. Pat. No. 6,033,506; and (4) a continuation-in-part of U.S. application Ser. No. 08/921,875 filed Sep. 2, 1997, now U.S. Pat. No. 6,033,506.

STATEMENT REGARDING FEDERALLY SPONSORED RESEARCH OR DEVELOPMENT

The United States Government has rights in this invention pursuant to contract No. DE-AC05-96OR22464 between the United States Department of Energy and Lockheed Martin Energy Research Corporation.

BACKGROUND OF THE INVENTION

The present invention relates to carbon foam and composites, and more particularly to a process for producing them.

The extraordinary mechanical properties of commercial carbon fibers are due to the unique graphitic morphology of the extruded filaments. See Edie, D. D., "Pitch and Mesophase Fibers," in *Carbon Fibers, Filaments and Composites*, Figueiredo (editor), Kluwer Academic Publishers, Boston, pp. 43–72 (1990). Contemporary advanced structural composites exploit these properties by creating a disconnected network of graphitic filaments held together by an appropriate matrix. Carbon foam derived from a pitch precursor can be considered to be an interconnected network of graphitic ligaments or struts, as shown in FIG. 1. As such interconnected networks, they represent a potential alternative as a reinforcement in structural composite materials.

Typical processes for producing carbon foams utilize a blowing technique to produce a foam of the pitch precursor in which the pitch is melted and passed from a high pressure region to a low pressure region. Thermodynamically, this produces a "Flash," thereby causing the low molecular weight compounds in the pitch to vaporize (the pitch boils), resulting in a pitch foam. See Hagar, Joseph W. and Max L. Lake, "Novel Hybrid Composites Based on Carbon Foams," *Mat. Res. Soc. Symp.*, Materials Research Society, 270: 29–34 (1992), Hagar, Joseph W. and Max L. Lake, "Formulation of a Mathematical Process Model Process Model for the Foaming of a Mesophase Carbon Precursor," *Mat. Res. Soc. Symp.*, Materials Research Society, 270:35–40 (1992), Gibson, L. J. and M. F. Ashby, *Cellular Solids: Structures & Properties*, Pergamon Press, New York (1988), Gibson, L. J., Mat. Sci. and Eng A110, 1 (1989), Knippenberg and B. Lersmacher, Phillips Tech. Rev., 36(4), (1976), and Bonzom, A., P. Crepaux and E. J. Moutard, U.S. Pat. No. 4,276,246, (1981). Then, the pitch foam must be oxidatively stabilized by heating in air (or oxygen) for many hours, thereby, cross-linking the structure and "setting" the pitch so it does not melt during carbonization. See Hagar, Joseph W. and Max L. Lake, "Formulation of a Mathematical Process Model Process Model for the Foaming of a Mesophase Carbon Precursor", *Mat. Res. Soc. Symp.*, Materials Research Society, 270:35–40 (1992) and White, J. L., and P. M. Shaeffer, *Carbon*, 27:697 (1989). This is a time consuming step and can be an expensive step depending on the part size and equipment required. The "set" or oxidized pitch is then carbonized in an inert atmosphere to temperatures as high as 1100° C., followed by subjection to temperatures as high as 3000° C. to produce a graphitic carbon foam.

Other techniques utilize a polymeric precursor, such as phenolic, urethane, or blends of these with pitch. See Hagar, Joseph W. and Max L. Lake, "Idealized Strut Geometries for Open-Celled Foams," *Mat. Res. Soc. Symp.*, Materials Research Society, 270:41–46 (1992), Aubert, J. W., (MRS Symposium Proceedings, 207:117–127 (1990), Cowlard, F. C. and J. C. Lewis, *J. of Mat. Sci.*, 2:507–512 (1967) and Noda, T., Inagaki and S. Yamada, *J. of Non-Crystalline Solids*, 1:285–302, (1969). High pressure is applied and the sample is heated. At a specified temperature, the pressure is released, thus causing the liquid to foam as volatile compounds are released. The polymeric precursors are cured and then carbonized without a stabilization step. However, these precursors produce a "glassy" or vitreous carbon which does not exhibit graphitic structure and, thus, has low thermal conductivity and low stiffness. See Hagar, Joseph W. and Max L. Lake, "Idealized Strut Geometries for Open-Celled Foams," *Mat. Res. Soc. Symp.*, Materials Research Society, 270:41–46 (1992).

In either case, once the foam is formed, it is then bonded in a separate step to the facesheet used in the composite. This can be an expensive step in the utilization of the foam.

The process of this invention overcomes these limitations, by not requiring a "blowing" or "pressure release" technique to produce the foam. Furthermore, an oxidation stabilization step is not required, as in other methods used to produce pitch-based carbon foams. This process is less time consuming, and therefore, will be lower in cost and easier to fabricate. Moreover, the foam can be produced with an integrated sheet of high thermal conductivity carbon on the surface of the foam, thereby producing a carbon foam with a smooth sheet on the surface to improve heat transfer.

The present invention further relates to a thermally-conductive foam material derived from carbonaceous precursor, and more particularly to a thermally conductive, pitch-derived carbon foam having high thermal conductivity and heat exchanging properties.

The removal of unwanted heat is a frequently encountered problem. Conventional solutions include cooling fans, ice packs and refrigeration systems. In the latter, a working fluid is compressed (condensed) and pumped into an expansive chamber or pipe system where it evaporates, pulling heat from the atmosphere to satisfy its needed latent heat of vaporization, and thus cooling the surrounding environment. Air blown through the heat exchanger may be cooled and circulated to cool larger volumes such as in domestic and automotive air conditioning systems.

Active cooling (refrigeration) typically requires complex equipment including pumps, valves, compressors, etc. Many refrigeration systems require the use of CFCs (Freon), which is considered hazardous or environmentally unfriendly. An evaporative cooling system with a high thermal conductivity medium would offer a simpler, lower cost alternative. There is a need for portable coolers which are lightweight and inexpensive so as to be deployed in the field or in third world countries.

The thermally conductive carbon foam of this invention overcomes the limitations of the prior art.

In addition, the present invention relates to porous carbon foam filled with phase change materials and encased to form a heat sink product, and more particularly to a process for producing them.

There are currently many applications that require the storage of large quantities of heat for either cooling or heating an object. Typically these applications produce heat so rapidly that normal dissipation through cooling fins, natural convection, or radiation cannot dissipate the heat quickly enough and, thus, the object over heats. To alleviate this problem, a material with a large specific heat capacity, such as a heat sink, is placed in contact with the object as it heats. During the heating process, heat is transferred to the heat sink from the hot object, and as the heat sink's temperature rises, it "stores" the heat more rapidly than can be dissipated to the environment through convection. Unfortunately, as the temperature of the heat sink rises the heat flux from the hot object decreases, due to a smaller temperature difference between the two objects. Therefore, although this method of energy storage can absorb large quantities of heat in some applications, it is not sufficient for all applications.

Another method of absorbing heat is through a change of phase of the material, rather than a change in temperature. Typically, the phase transformation of a material absorbs two orders of magnitude greater thermal energy than the heat capacity of the material. For example, the vaporization of 1 gram of water at 100° C. absorbs 2,439 Joules of energy, whereas changing the temperature of water from 99° C. to 100° C. only absorbs 4.21 Joules of energy. In other words, raising the temperature of 579 grams of water from 99° C. to 100° C. absorbs the same amount of heat as evaporating 1 gram of water at 100° C. The same trend is found at the melting point of the material. This phenomenon has been utilized in some applications to either absorb or evolve tremendous amounts of energy in situations where heat sinks will not work.

Although a solid block of phase change material has a very large theoretical capacity to absorb heat, the process is not a rapid one because of the difficulties of heat transfer and thus it cannot be utilized in certain applications. However, the utilization of the high thermal conductivity foam will overcome the shortcomings described above. If the high conductivity foam is filled with the phase change material, the process can become very rapid. Because of the extremely high conductivity in the struts of the foam, as heat contacts the surface of the foam, it is rapidly transmitted throughout the foam to a very large surface area of the phase change material. Thus, heat is very quickly distributed throughout the phase change material, allowing it to absorb or emit thermal energy extremely quickly without changing temperature, thus keeping the driving force for heat transfer at its maximum.

Heat sinks have been utilized in the aerospace community to absorb energy in applications such as missiles and aircraft where rapid heat generation is found. A material that has a high heat of melting is encased in a graphite or metallic case, typically aluminum, and placed in contact with the object creating the heat. Since most phase change materials have a low thermal conductivity, the rate of heat transfer through the material is limited, but this is offset by the high energy absorbing capability of the phase change. As heat is transmitted through the metallic or graphite case to the phase change material, the phase change material closest to the heat source begins to melt. Since the temperature of the phase change material does not change until all the material melts, the flux from the heat source to the phase change material remains relatively constant. However, as the heat continues to melt more phase change material, more liquid is formed. Unfortunately, the liquid has a much lower thermal conductivity, thus hampering heat flow further. In fact, the overall low thermal conductivity of the solid and liquid phase change materials limits the rate of heat absorption and, thus, reduces the efficiency of the system.

SUMMARY OF THE INVENTION

The general object of the present invention is to provide carbon foam and a composite from a mesophase or isotropic pitch such as synthetic, petroleum or coal-tar based pitch.

Another object is to provide a carbon foam and a composite from pitch which does not require an oxidative stabilization step.

These and other objectives are accomplished by a method of producing carbon foam wherein an appropriate mold shape is selected and preferably an appropriate mold release agent is applied to walls of the mold. Pitch is introduced to an appropriate level in the mold, and the mold is purged of air such as by applying a vacuum. Alternatively, an inert fluid could be employed. The pitch is heated to a temperature sufficient to coalesce the pitch into a liquid which preferably is of about 50° C. to about 100° C. above the softening point of the pitch. The vacuum is released and an inert fluid applied at a static pressure up to about 1000 psi. The pitch is heated to a temperature sufficient to cause gases to evolve and foam the pitch. The pitch is further heated to a temperature sufficient to coke the pitch and the pitch is cooled to room temperature with a simultaneous and gradual release of pressure.

In another aspect, the previously described steps are employed in a mold composed of a material such that the molten pitch does not wet.

In yet another aspect, the objectives are accomplished by the carbon foam product produced by the methods disclosed herein including a foam product with a smooth integral facesheet.

In still another aspect a carbon foam composite product is produced by adhering facesheets to a carbon foam produced by the process of this invention.

Another object of the present invention is to provide a thermally conductive carbon foam.

Yet another object is to provide a method of producing a cooling effect utilizing a thermally conductive carbon foam.

Still another object is to provide a heat exchanging device employing a carbon foam core.

These and other objectives are accomplished in one embodiment by a thermally conductive, pitch-derived carbon foam.

In one aspect the foam has an open cell ligament composition.

In another embodiment, the objectives are accomplished by a method of producing a cooling effect wherein a thermally conductive, pitch-derived carbon foam is selected.

The foam is contacted with an evaporating liquid, and an evaporation of the evaporating liquid is effected.

In still another embodiment, the objectives are accomplished by a heat exchanging device having a thermally conductive, pitch-derived carbon foam core. A fluid impermeable coating covers a portion of the foam core and exposes a portion. The exposed portion provides access and egress for an evaporating liquid.

In another aspect, there are upper and lower reservoirs in fluid communication with a core and a pumping device in fluid communication with the upper and lower reservoir adapted to deliver the evaporating liquid from the lower reservoir to the upper reservoir.

In still another aspect, the carbon foam is positioned in separate columns to provide a cold storage container with spacing between the columns.

In yet another aspect, relative motion between the foam and heat transfer fluid is developed in the presence or absence of an evaporative liquid by moving the foam, thereby accelerating evaporation and increasing the cooling effect.

Still another object of the present invention is the production of encased high thermal conductivity porous carbon foam filled with a phase change material wherein tremendous amounts of thermal energy are stored and emitted very rapidly. The porous foam that has been filled with a phase change material (PCM) will conduct heat to the phase change material such that the temperature of the phase change material will remain close to the operating temperature of the device. As heat is added to the surface, from a heat source such as a computer chip, friction due to re-entry through the atmosphere, or radiation such as sunlight, it is transmitted rapidly and uniformly throughout the foam and then to the phase change material. As the material changes phase, it absorbs orders of magnitude more energy than non-PCM material due to transfer of the latent heat of fusion or vaporization. Conversely, the filled foam can be utilized to emit energy rapidly when placed in contact with a cold object.

Non-limiting embodiments disclosed herein are a device to rapidly thaw frozen foods or freeze thawed foods, a design to prevent overheating of satellites or store thermal energy as they experience cyclic heating during orbit, and a design to cool leading edges during hypersonic flight or re-entry from space.

DETAILED DESCRIPTION OF THE INVENTION

In order to illustrate the carbon foam product and composite of this invention, the following Examples I–XIX are set forth. They are not intended to limit the invention in any way.

EXAMPLE I

Pitch powder, granules, or pellets are placed in a mold with the desired final shape of the foam. These pitch materials can be solvated if desired. In this Example Mitsubishi ARA-24 mesophase pitch was utilized. A proper mold release agent or film is applied to the sides of the mold to allow removal of the part. In this case, Boron Nitride spray and Dry Graphite Lubricant were separately used as a mold release agent. If the mold is made from pure aluminum, no mold release agent is necessary since the molten pitch does not wet the aluminum and, thus, will not stick to the mold. Similar mold materials may be found that the pitch does not wet and, thus, they will not need mold release. The sample is evacuated to less than 1 torr and then heated to a temperature approximately 50 to 100° C. above the softening point. In this case where Mitsubishi ARA24 mesophase pitch was used, 300° C. was sufficient. At this point, the vacuum is released to a nitrogen blanket and then a pressure of up to 1000 psi is applied. The temperature of the system is then raised to 800° C., or a temperature sufficient to coke the pitch which is about 500° C. to about 1000° C. This is performed at a rate of no greater than about 5° C./min. and preferably at about 2° C./min. The temperature is held for at least 15 minutes to achieve an assured soak and then the furnace power is turned off and cooled to room temperature. Preferably the foam was cooled at a rate of approximately 1.5° C./min. with release of pressure at a rate of approximately 2 psi/min. Final foam temperatures for three product runs were 500° C., 630° C. and 800° C. During the cooling cycle, pressure is released gradually to atmospheric conditions. The foam was then heat treated to 1050° C. (carbonized) under a nitrogen blanket and then heat treated in separate runs to 2500° C. and 2800° C. (graphitized) in Argon.

Figure 1:
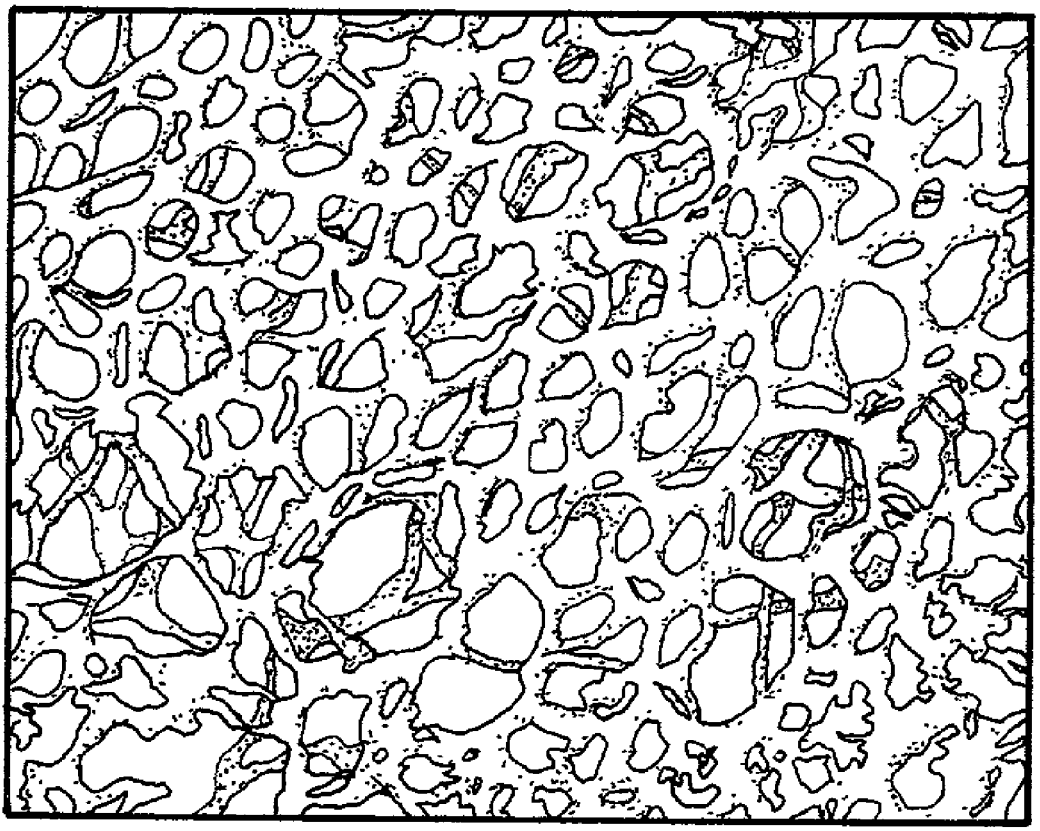
FIG. 1 is a micrograph illustrating typical carbon foam with interconnected carbon ligaments and open porosity.
Figure 2:
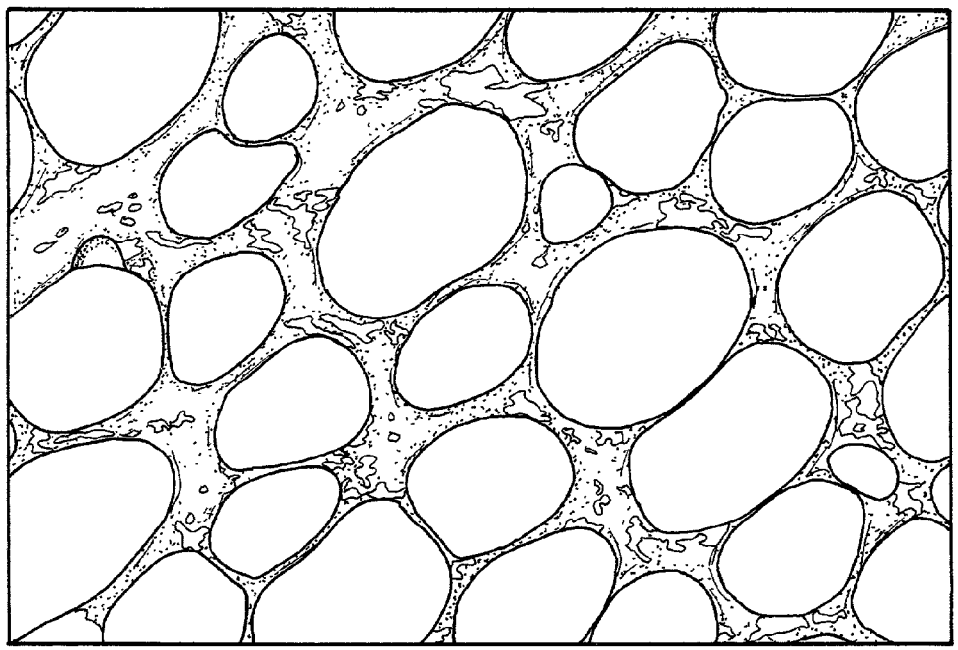
FIGS. 2–6 are micrographs of pitch-derived carbon foam graphitized at 2500° C. and at various magnifications.
Figure 3:
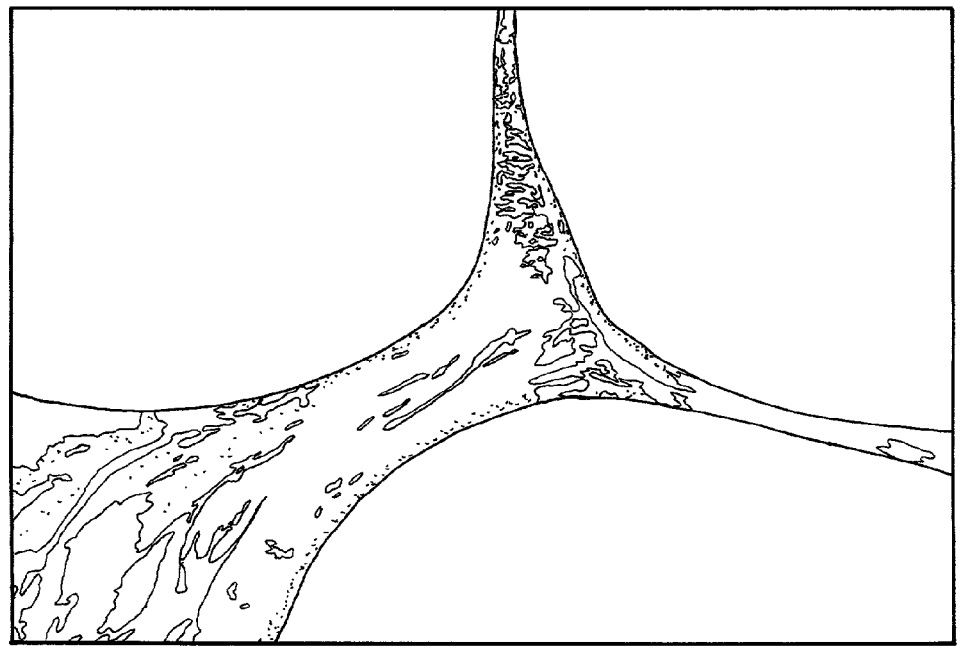
Figure 4:
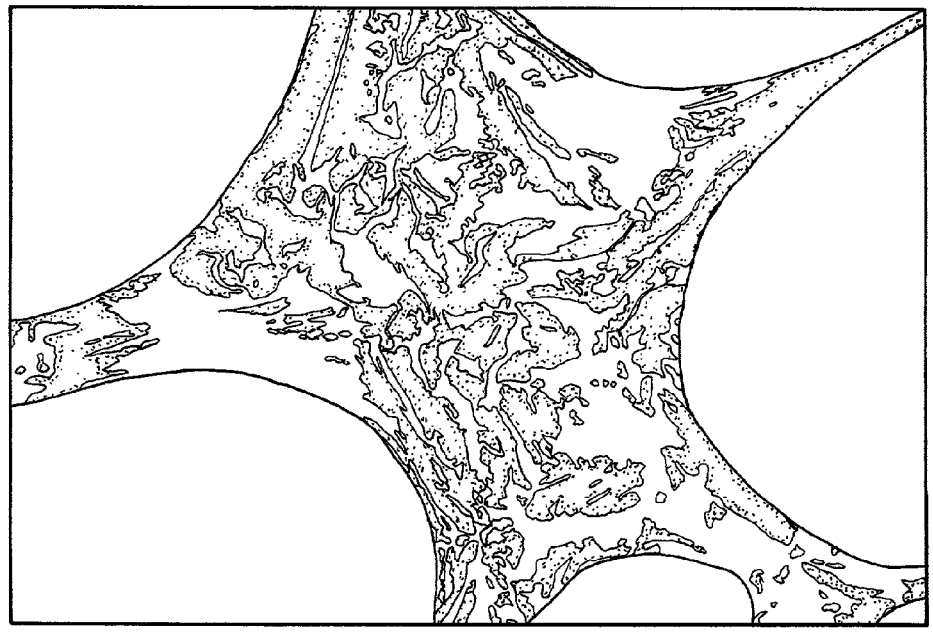
Figure 5:
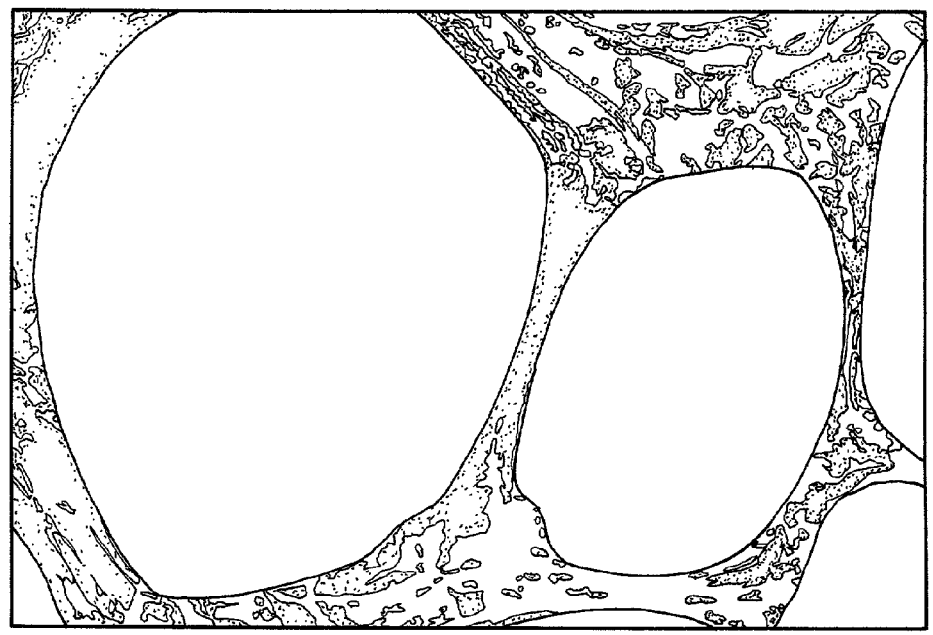
Figure 6:
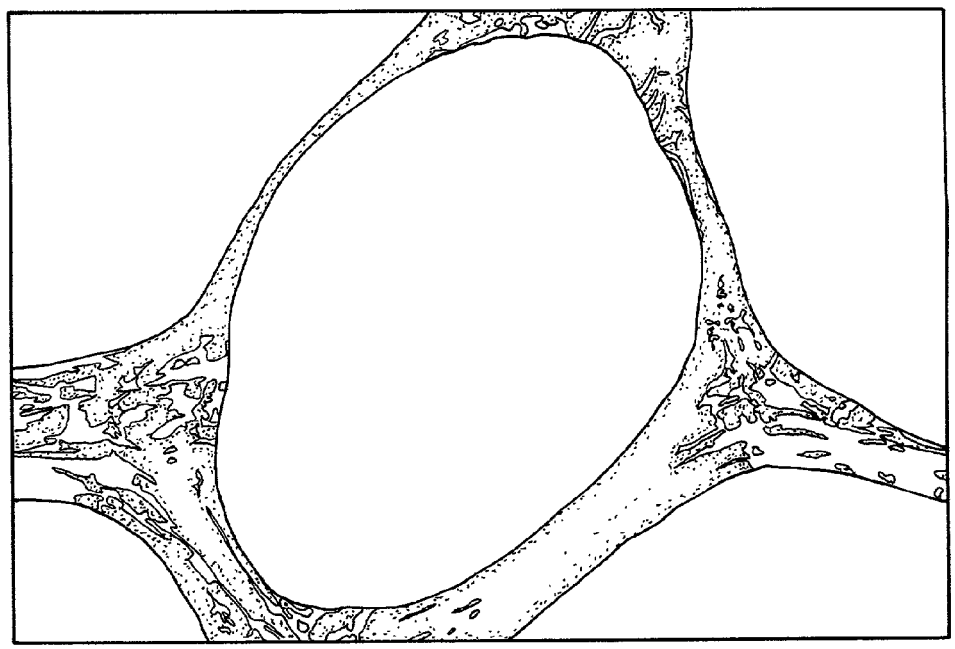
Figure 7:
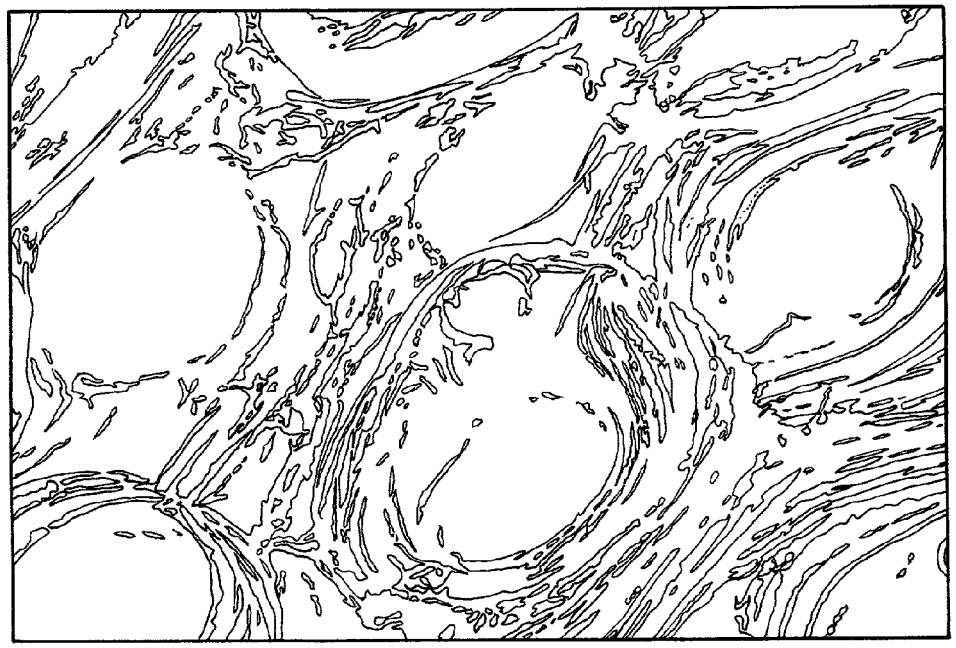
FIG. 7 is a drawing corresponding to a SEM micrograph (shown in FIG. 27) of the foam produced by the process of this invention.
Figure 8:
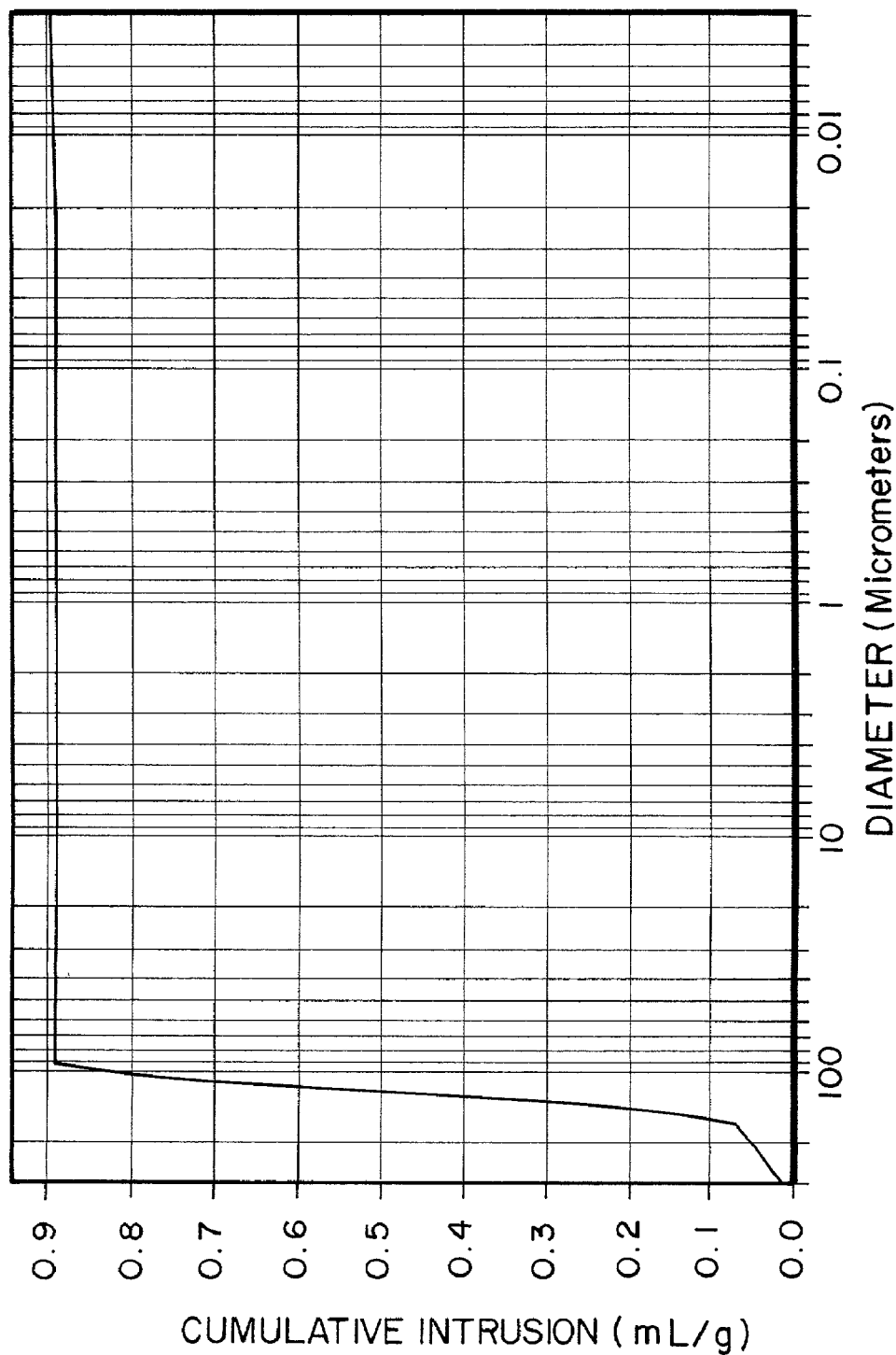
FIG. 8 is a chart illustrating cumulative intrusion volume versus pore diameter.
Figure 9:
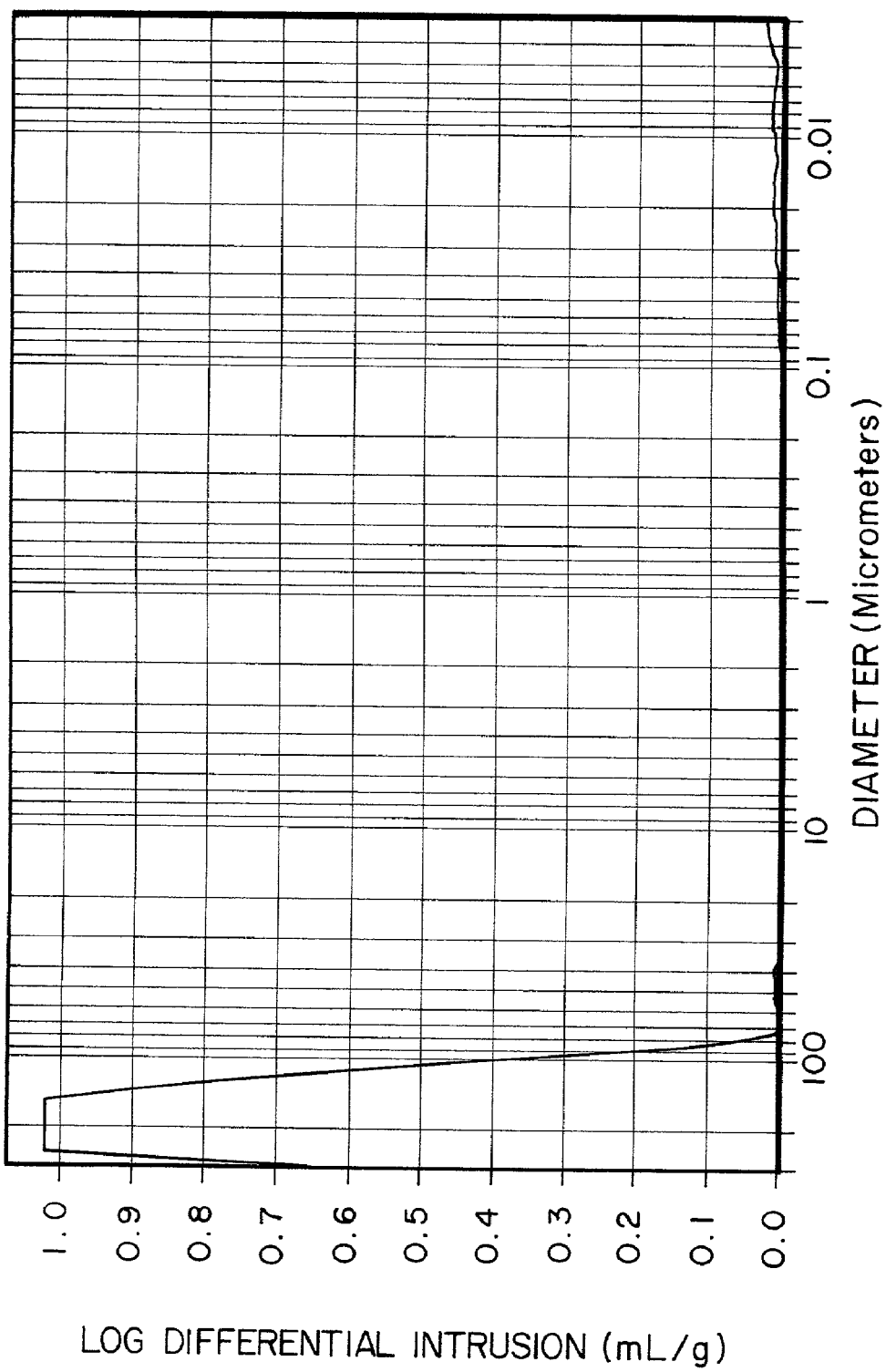
FIG. 9 is a chart illustrating log differential intrusion volume versus pore diameter.

Carbon foam produced with this technique was examined with photomicrography, scanning electron microscopy (SEM), X-ray analysis, and mercury porisimetry. As can be seen in the FIGS. 2–7, the interference patterns highlighting the isochromatic regions under cross-polarized light indicate that the struts of the foam are completely graphitic. That is, all of the pitch was converted to graphite and aligned along the axis of the struts. These struts are also similar in size and are interconnected throughout the foam. This would indicate that the foam would have high stiffness and good strength. As seen in FIG. 7 by the SEM micrograph of the foam, the foam is open cellular meaning that the porosity is not closed. FIGS. 8 and 9 are results of the mercury porisimetry tests. These tests indicate that the pore sizes are in the range of 90–200 microns.

Figure 10:
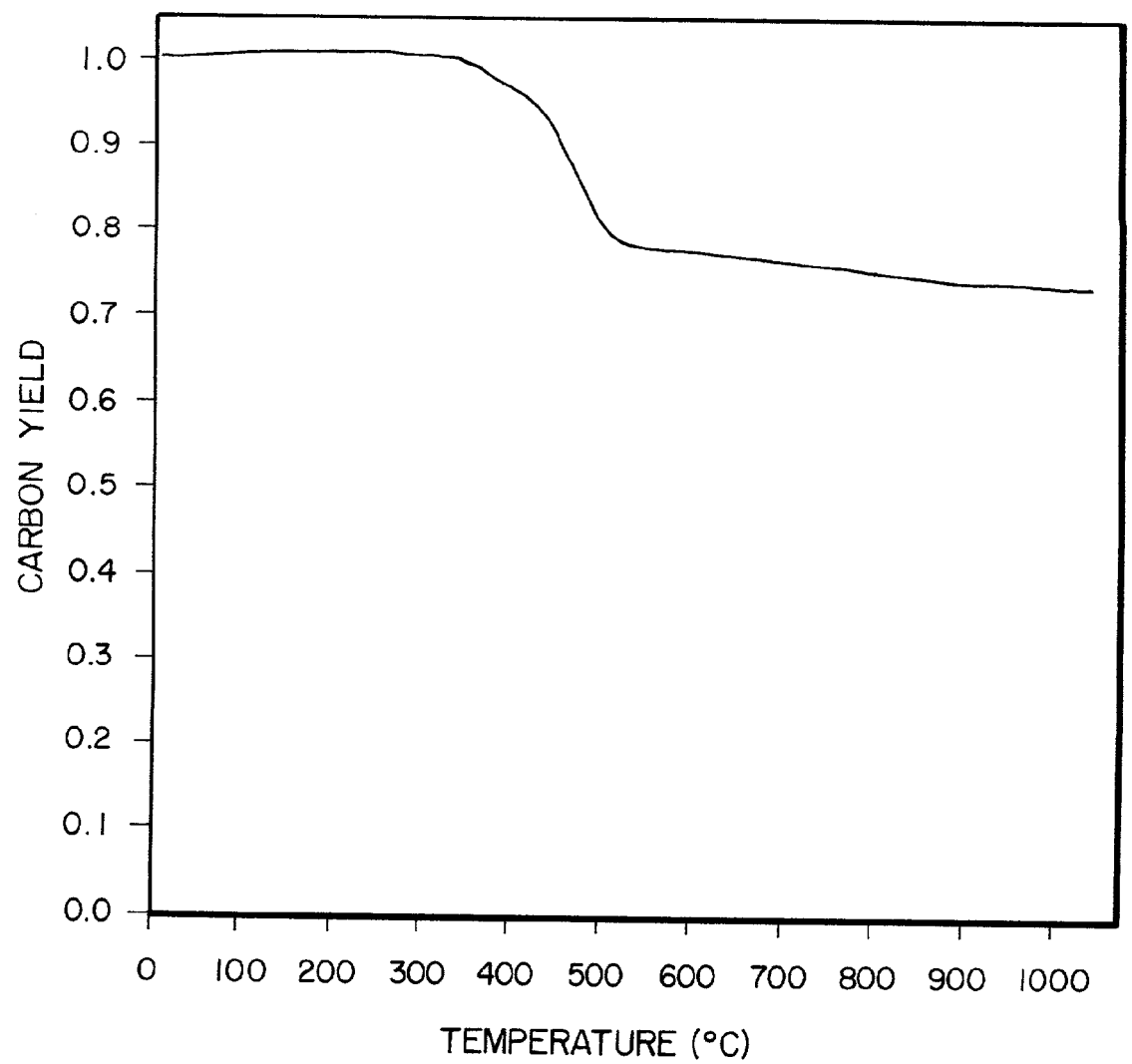
FIG. 10 is a graph illustrating the temperatures at which volatiles are given off from raw pitch.

A thermogravimetric study of the raw pitch was performed to determine the temperature at which the volatiles are evolved. As can be seen in FIG. 10, the pitch loses nearly 20% of its mass fairly rapidly in the temperature range between about 420° C. and about 480° C. Although this was performed at atmospheric pressure, the addition of 1000 psi pressure will not shift this effect significantly. Therefore, while the pressure is at 1000 psi, gases rapidly evolved during heating through the temperature range of 420° C. to 480° C. The gases produce a foaming effect (like boiling) on the molten pitch. As the temperature is increased further to temperatures ranging from 500° C. to 1000° C. (depending on the specific pitch), the foamed pitch becomes coked (or rigid), thus producing a solid foam derived from pitch. Hence, the foaming has occurred before the release of pressure and, therefore, this process is very different from previous art.

Samples from the foam were machined into specimens for measuring the thermal conductivity. The bulk thermal conductivity ranged from 58 W/m·K to 106 W/m·K. The average density of the samples was 0.53 g/cm$^3$. When weight is taken into account, the specific thermal conductivity of the pitch derived foam is over 4 times greater than that of copper. Further derivations can be utilized to estimate the thermal conductivity of the struts themselves to be nearly 700 W/m·K. This is comparable to high thermal conductivity carbon fibers produced from this same ARA24 mesophase pitch.

Figure 11:
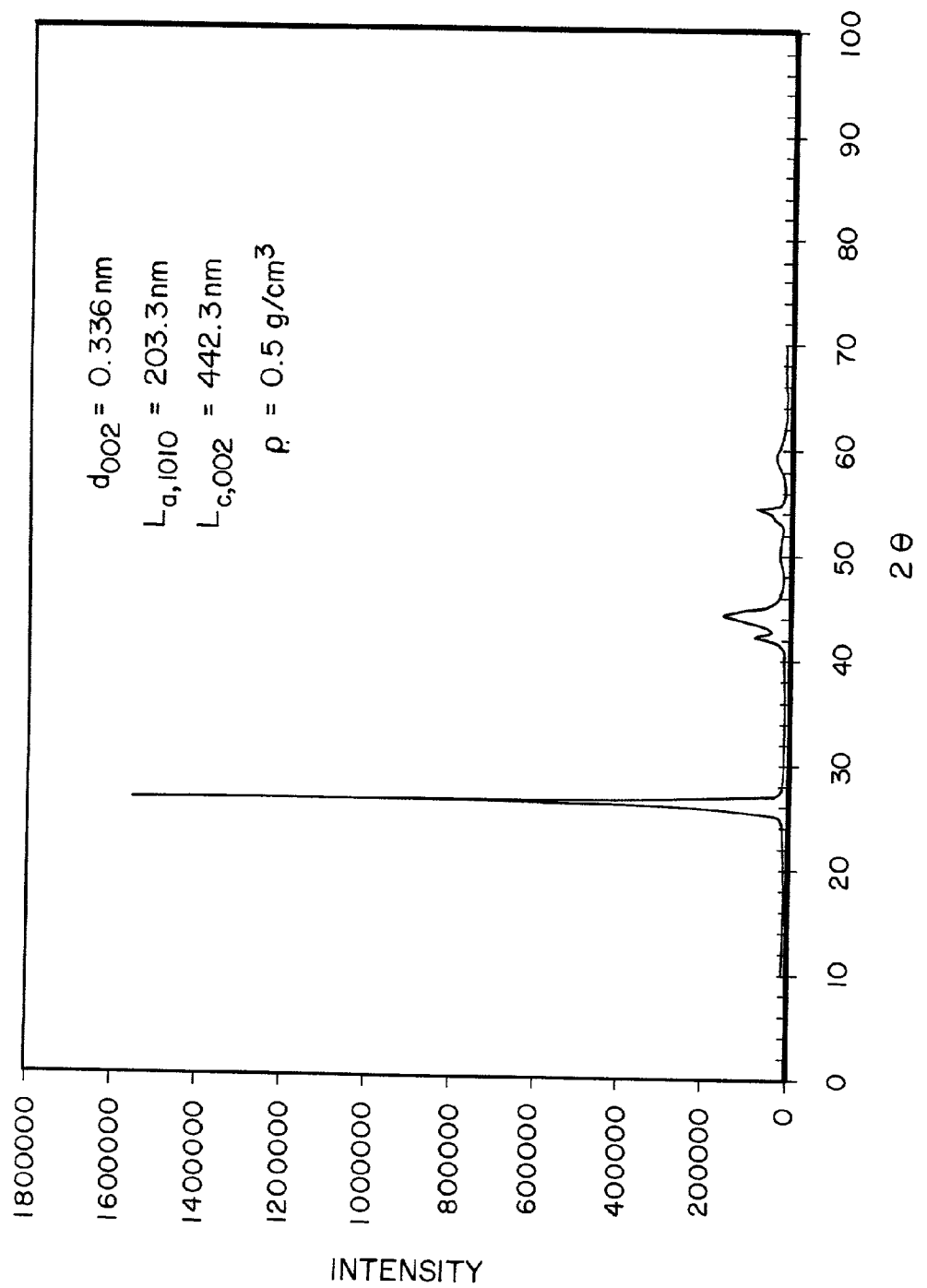
FIG. 11 is an X-ray analysis of the graphitized foam produced by the process of this invention.

X-ray analysis of the foam was performed to determine the crystalline structure of the material. The x-ray results are shown in FIG. 11. From this data, the graphene layer spacing ($d_{002}$) was determined to be 0.336 nm. The coherence length (La, 1010) was determined to be 203.3 nm and the stacking height was determined to be 442.3 nm.

The compression strength of the samples were measured to be 3.4 MPa and the compression modulus was measured to be 73.4 MPa. The foam sample was easily machined and could be handled readily without fear of damage, indicating a good strength.

It is important to note that when this pitch is heated in a similar manner, but under only atmospheric pressure, the pitch foams dramatically more than when under pressure. In fact, the resulting foam is so fragile that it could not even be handled to perform tests. Molding under pressure serves to limit the growth of the cells and produces a usable material.

EXAMPLE II

An alternative to the method of Example I is to utilize a mold made from aluminum. In this case two molds were used, an aluminum weighing dish and a sectioned soda can. The same process as set forth in Example I is employed except that the final coking temperature was only 630° C., so as to prevent the aluminum from melting.

Figure 12A:
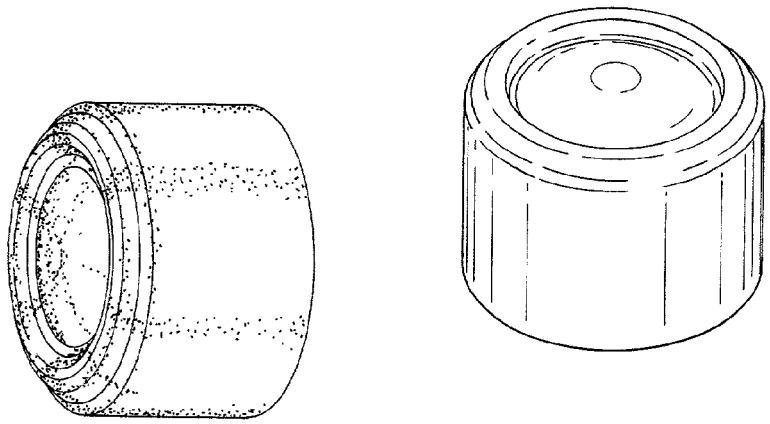
FIGS. 12A–C are photographs illustrating foam produced with aluminum crucibles and the smooth structure or face sheet that develops.
Figure 12B:
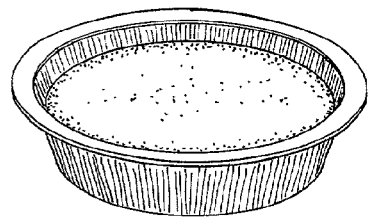
Figure 12C:
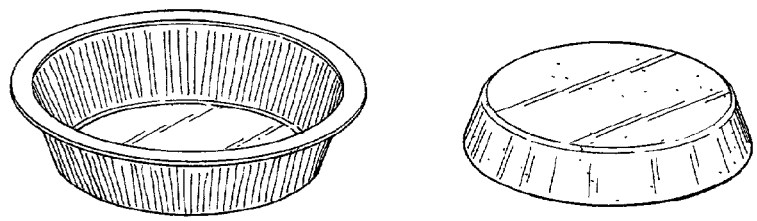

FIGS. 12A–C illustrate the ability to utilize complex shaped molds for producing complex shaped foam. In one case, shown in FIG. 12A, the top of a soda can was removed and the remaining can used as a mold. No release agent was utilized. Note that the shape of the resulting part conforms to the shape of the soda can, even after graphitization to 2800° C. This demonstrates the dimensional stability of the foam and the ability to produce near net shaped parts.

In the second case, as shown in FIGS. 12B and C employing an aluminum weight dish, a very smooth surface was formed on the surface contacting the aluminum. This is directly attributable to the fact that the molten pitch does not wet the surface of the aluminum. This would allow one to produce complex shaped parts with smooth surfaces so as to improve contact area for bonding or improving heat transfer. This smooth surface will act as a face sheet and, thus, a foam-core composite can be fabricated in-situ with the fabrication of the face sheet. Since it is fabricated together as an integral material, no interface joints result and thermal stresses will be less, resulting in a stronger material.

The following examples illustrate the production of a composite material employing the foam of this invention.

EXAMPLE III

Figure 13A:
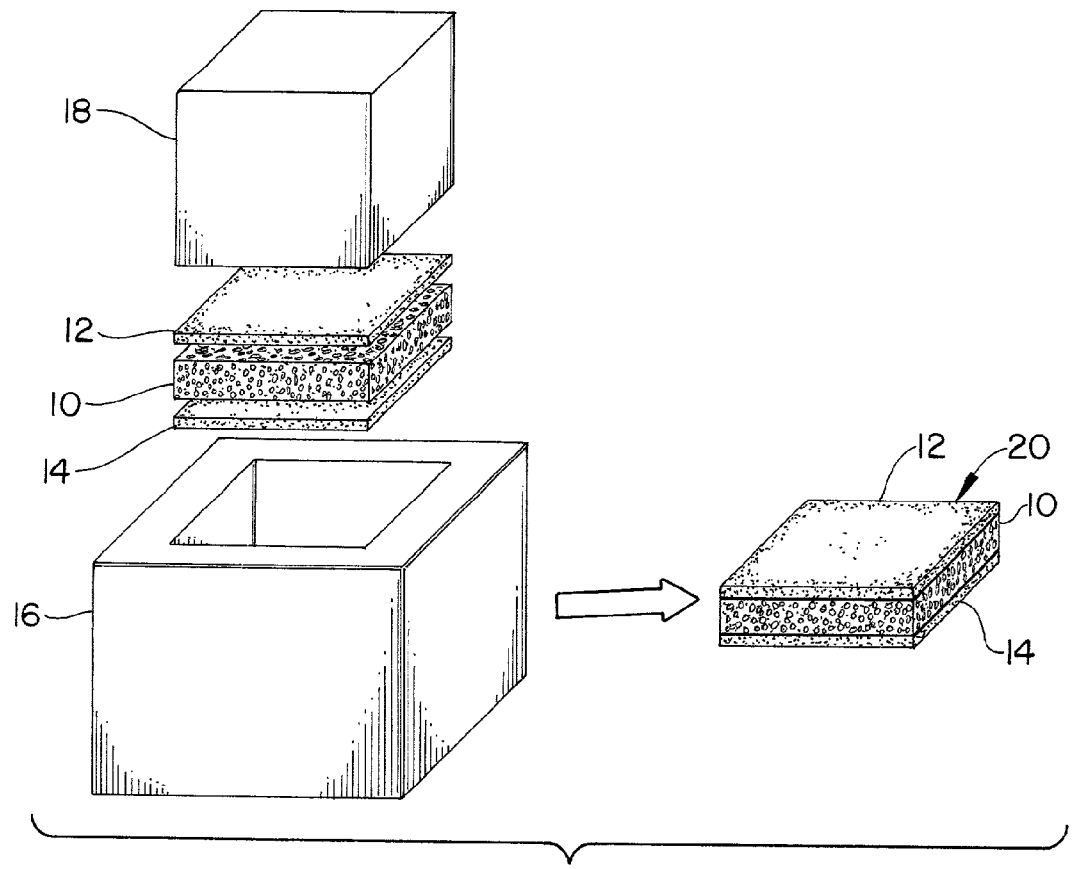
FIG. 13A is a schematic view illustrating the production of a carbon foam composite made in accordance with this invention.
Figure 13B:
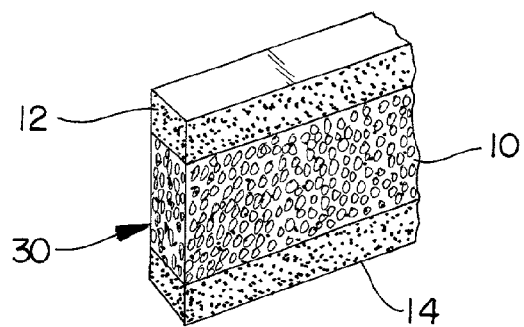
FIG. 13B is a perspective view of the carbon foam composite of this invention.

Pitch derived carbon foam was produced with the method described in Example I. Referring to FIG. 13A the carbon foam 10 was then machined into a block 2"×2"×½". Two pieces 12 and 14 of a prepeg comprised of Hercules AS4 carbon fibers and ICI Fibirite Polyetheretherkeytone thermoplastic resin also of 2"×2"×½" size were placed on the top and bottom of the foam sample, and all was placed in a matched graphite mold 16 for compression by graphite plunger 18. The composite sample was heated under an applied pressure of 100 psi to a temperature of 380° C. at a rate of 5 C./min. The composite was then heated under a pressure of 100 psi to a temperature of 650° C. The foam core sandwich panel generally 20 was then removed from the mold and carbonized under nitrogen to 1050° C. and then graphitized to 2800° C., resulting in a foam with carbon-carbon facesheets bonded to the surface. The composite generally 30 is shown in FIG. 13B.

EXAMPLE IV

Pitch derived carbon foam was produced with the method described in Example I. It was then machined into a block 2"×2"×½". Two pieces of carbon-carbon material, 2"×2"×½", were coated lightly with a mixture of 50% ethanol, 50% phenolic Durez© Resin available from Occidental Chemical Co. The foam block and carbon-carbon material were positioned together and placed in a mold as indicated in Example III. The sample was heated to a temperature of 150° C. at a rate of 5° C./min and soaked at temperature for 14 hours. The sample was then carbonized under nitrogen to 1050° C. and then graphitized to 2800° C., resulting in a foam with carbon-carbon facesheets bonded to the surface. This is also shown generally at 30 in FIG. 13B.

EXAMPLE V

Pitch derived carbon foam was produced with the method described in Example I. The foam sample was then densified with carbon by the method of chemical vapor infiltration for 100 hours. The density increased to 1.4 g/cm$^3$, the flexural strength was 19.5 MPa and the flexural modulus was 2300 MPa. The thermal conductivity of the raw foam was 58 W/m·K and the thermal conductivity of the densified foam was 94 W/m·K.

EXAMPLE VI

Pitch derived carbon foam was produced with the method described in Example I. The foam sample was then densified with epoxy by the method of vacuum impregnation. The epoxy was cured at 150° C. for 5 hours. The density increased to 1.37 g/cm$^3$ and the flexural strength was measured to be 19.3 MPa.

It is obvious that other materials, such as metals, ceramics, plastics, or fiber reinforced plastics could be bonded to the surface of the foam of this invention to produce a foam core composite material with acceptable properties. It is also obvious that ceramics, or glass, or other materials could be impregnated into the foam for densification.

Based on the data taken to date from the carbon foam material, several observations can be made and the important features of the invention are:
1. Pitch-based carbon foam can be produced without an oxidative stabilization step, thus saving time and costs.
2. High graphitic alignment in the struts of the foam is achieved upon graphitization to 2500° C., and thus high thermal conductivity and stiffness will be exhibited by the foam, making them suitable as a core material for thermal applications.
3. High compressive strengths should be achieved with mesophase pitch-based carbon foams, making them suitable as a core material for structural applications.
4. Foam core composites can be fabricated at the same time as the foam is generated, thus saving time and costs.
5. Rigid monolithic preforms can be made with significant open porosity suitable for densification by the Chemical Vapor Infiltration method of ceramic and carbon infiltrants.
6. Rigid monolithic preforms can be made with significant open porosity suitable for activation, producing a monolithic activated carbon.
7. It is obvious that by varying the pressure applied, the size of the bubbles formed during the foaming will change and, thus, the density, strength, and other properties can be affected.

The following alternative procedures and products can also be effected by the process of this invention:
1. Fabrication of preforms with complex shapes for densification by CVI or Melt Impregnation.
2. Activated carbon monoliths.
3. Optical absorbent.
4. Low density heating elements.
5. Firewall Material.
6. Low secondary electron emission targets for high-energy physics applications.

It will thus be seen that the present invention provides for the manufacture of pitch-based carbon foam for structural and thermal composites. The process involves the fabrication of a graphitic foam from a mesophase or isotropic pitch which can be synthetic, petroleum, or coal-tar based. A blend of these pitches can also be employed. The simplified process utilizes a high pressure high temperature furnace and thereby, does not require an oxidative stabilization step. The foam has a relatively uniform distribution of pore sizes (≈100 microns), very little closed porosity, and density of approximately 0.53 g/cm$^3$. The mesophase pitch is stretched along the struts of the foam structure and thereby produces a highly aligned graphitic structure in the struts. These struts will exhibit thermal conductivities and stiffness similar to the very expensive high performance carbon fibers (such as P-120 and K1100). Thus, the foam will exhibit high stiffness and thermal conductivity at a very low density (≈0.5 g/cc). This foam can be formed in place as a core material for high temperature sandwich panels for both thermal and structural applications, thus reducing fabrication time.

By utilizing an isotropic pitch, the resulting foam can be easily activated to produce a high surface area activated carbon. The activated carbon foam will not experience the problems associated with granules such as attrition, channeling, and large pressure drops.

The high thermal conductivity carbon foam of the invention may be utilized to provide an evaporatively cooled heat sink or heat exchanger. The carbon foam, as derived from mesophase pitch and as depicted in FIGS. 2–7, has an open structure which allows free access to a working fluid to the cell walls/ligaments. When the working fluid contacts the cell surface it evaporates, and the latent heat of vaporization causes cooling of the carbon foam. The extent of cooling depends upon the working fluid and the ambient conditions (temperature and pressure). The heat sink/exchanger temperature has been shown to fall to less than 223K (−50° C.) using acetone as the working fluid at a pressure of 1200 microns Hg (1.2 torr), and 0.5° C. using acetone as the working fluid at ambient temperature and pressure. Forced air flow over the carbon foam increases the temperature drop in excess of that observed under ambient conditions. The heat sink/exchanger described herein finds applications in heat removal systems such as personal/body cooling suits, portable refrigeration systems or coolers, and air conditioning systems (hold and automotive).

The following Examples demonstrate the evaporative cooling effect on the previously described carbon foam when contacted with different working fluids as represented by acetone, ethanol and water. These Examples are not intended to limit the invention in any way. The foamed carbon was doused or partially immersed in the working fluid. Upon removal from the working fluid, and as indicated in Examples VII–X, the foam sample was placed in a vacuum furnace with a thermocouple penetrating the foam sample. The foam temperature was monitored as a function of time and pressure (vacuum). The ambient laboratory temperature was approximately 21° C.

EXAMPLE VII

Acetone

| Time(minutes) | Pressure(Torr) | Temperature(° C.) |
|---|---|---|
| 0 | 740 | 13.5 |
| 1 | 29 | −37.5 |
| 2 | 29 | −46.7 |
| 3 | 1.2 | −51.8 |
| 4 | 1.2 | −53.4 |

When the sample was removed from the vacuum furnace it was noted that ice had formed, presumably from moisture condensed from the furnace atmosphere, or desorbed from the foam.

EXAMPLE VIII

Ethanol

| Time(minutes) | Pressure(Torr) | Temperature(° C.) |
|---|---|---|
| 0 | 740 | 20.5 |
| 1 | 29 | 5.3 |
| 2 | 29 | −14.7 |
| 3 | 1.2 | −21.7 |
| 4 | 1.2 | −25.1 |
| 5 | 1.1 | −26.8 |
| 6 | 1.0 | −28.6 |

EXAMPLE IX

Water

| Time(minutes) | Pressure(Torr) | Temperature(° C.) |
|---|---|---|
| 0 | 740 | 20.5 |
| 1 | 29 | 16.4 |
| 2 | 29 | 16.5 |
| 3 | 29 | 16.6 |
| 4 | 29 | 14.6 |
| 5 | 29 | 12.9 |
| 6 | 29 | 10.5 |
| 7 | 29 | 2.6 |
| 8 | 29 | −1.5 |
| 9 | 29 | −5.5 |

In the instance of Example IX the sample was immersed in water in vacuum to ensure that the foam was saturated. This probably allowed an excess of water to penetrate the sample and reduced the exposed foam surface area available for evaporation. Moreover, the resultant high water partial pressure in the furnace made it impossible to attain good vacuum in a reasonable time. Consequently, the experiment was repeated in Example X, but with substantially less water applied to the foam.

EXAMPLE X

Water (Repeat)

| Time(minutes) | Pressure(Torr) | Temperature(° C.) |
|---|---|---|
| 0 | 740 | 19.9 |
| 1 | 29 | 14.5 |
| 2 | 29 | 0.3 |
| 3 | 29 | −5.5 |

In this case, sub-zero temperatures were attained in a much shorter time than for Example IX.

Figure 14:
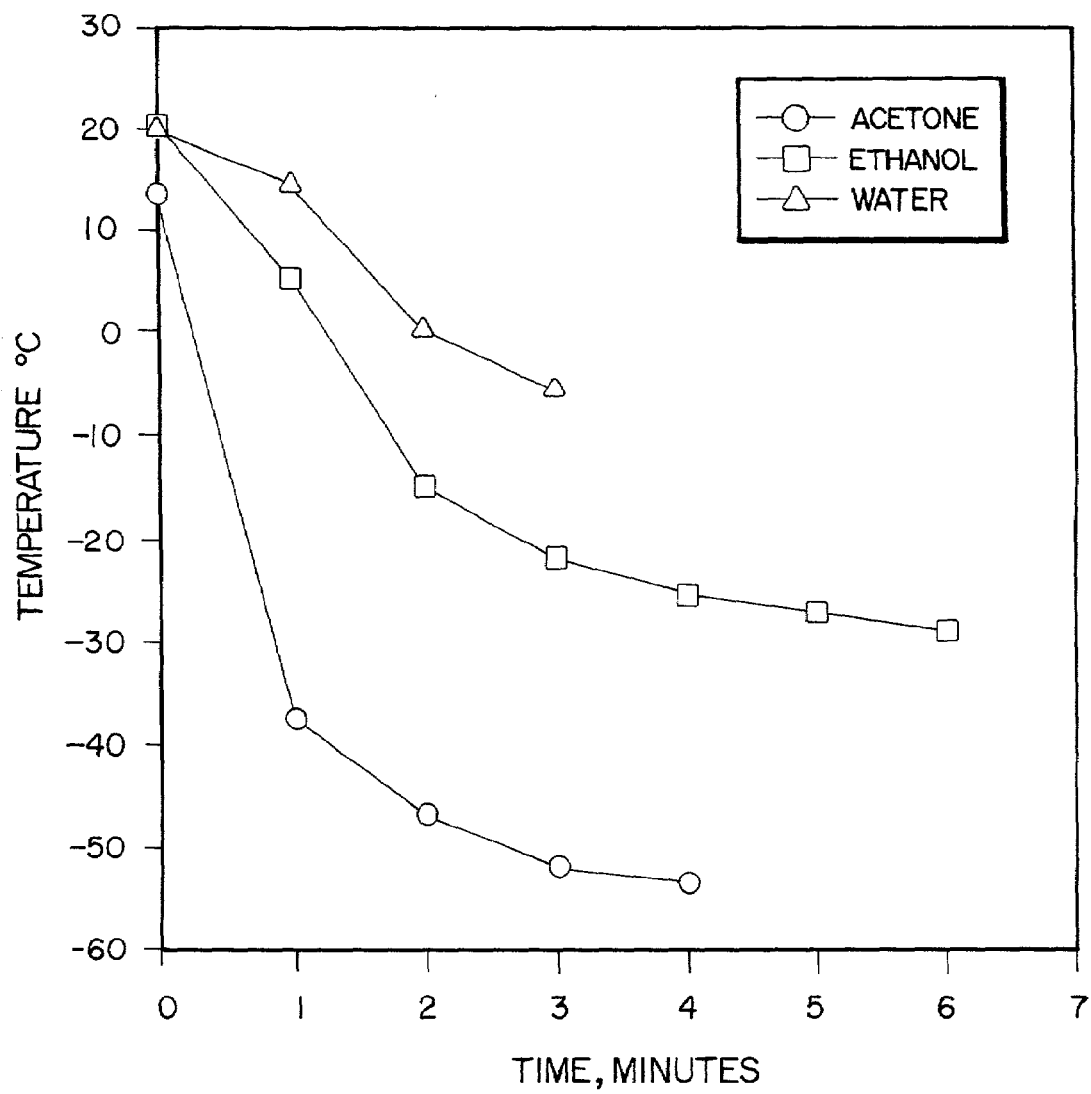
FIGS. 14–16 are charts plotting temperature/time of the carbon foam resulting from the evaporation of a working fluid according to this invention.

The data for Examples VII, VIII and X are plotted in FIG. 14. The lowest temperature observed (−53.4° C.) was attained in 4 minutes using acetone as the working fluid. Temperatures of −24.1° C. and −5.5° C. were attained over the same time period when the working fluid was ethanol and water, respectively.

A further series of tests as set forth in Examples XI–XIII were performed to show the effect of evaporative cooling at atmospheric pressure and temperature. The foamed carbon sample was placed in a petri dish. A thermocouple was located in a hole machined into the foam. The carbon foam was doused with the working fluid until the bottom of the petri dish was completely covered with the working fluid. The resultant foam temperature was then noted as a function of time.

EXAMPLE XI

Acetone

| Time(minutes) | Temperature(° C.) |
|---|---|
| 0 | 21.7 |
| 1 | 15.7 |
| 2 | 13.6 |
| 3 | 11.5 |
| 4 | 10.3 |
| 5 | 8.9 |
| 6 | 8.0 |
| 7 | 7.3 |
| 8 | 6.6 |
| 9 | 6.1 |
| 10 | 5.7 |
| 11 | 5.3 |
| 12 | 4.9 |
| 13 | 4.5 |
| 14 | 4.3 |
| 15 | 4.1 |
| 16 | 3.9 |
| 17 | 3.7 |
| 18 | 3.5 |
| 19 | 3.4 |
| 20 | 3.2 |
| 21 | 3.0 |
| 22 | 2.9 |
| 23 | 2.7 |
| 24 | 2.6 |
| 25 | 2.4 |
| 26 | 2.3 |
| 27 | 2.1 |
| 28 | 2.0 |
| 29 | 1.8 |
| 30 | 1.6 |
| 31 | 1.4 |
| 32 | 1.3 |
| 33 | 1.1 |
| 34 | 1.0 |
| 35 | 0.8 |
| 36 | 0.7 |
| 37 | 0.6 |
| 38 | 0.5 |

After 38 minutes there was no acetone visible in the petri dish or under the carbon foam sample. The sample was placed in an air circulating oven at 60° C. to dry it and then allowed to cool to ambient temperature.

EXAMPLE XII

Ethanol

| Time(minutes) | Temperature(° C.) |
|---|---|
| 0 | 21.6 |
| 1 | 20.3 |
| 2 | 19.6 |
| 3 | 19.0 |
| 4 | 18.6 |
| 5 | 18.1 |

| Time(minutes) | Temperature(° C.) |
|---|---|
| 6 | 17.8 |
| 7 | 17.4 |
| 8 | 17.1 |
| 9 | 16.9 |
| 10 | 16.7 |
| 11 | 16.5 |
| 12 | 16.3 |
| 13 | 16.2 |
| 14 | 16.0 |
| 15 | 15.8 |
| 16 | 15.7 |
| 17 | 15.6 |
| 18 | 15.5 |
| 19 | 15.4 |
| 20 | 15.3 |
| 21 | 15.1 |
| 22 | 15.0 |
| 23 | 15.0 |
| 24 | 14.9 |
| 25 | 14.8 |
| 26 | 14.8 |
| 27 | 14.8 |
| 28 | 14.7 |
| 29 | 14.7 |
| 30 | 14.6 |
| 31 | 14.6 |
| 32 | 14.6 |
| 33 | 14.5 |
| 34 | 14.5 |
| 35 | 14.4 |
| 36 | 14.4 |
| 37 | 14.4 |
| 38 | 14.3 |

After 38 minutes there was a significant amount of ethanol visible in the bottom of the petri dish. The sample was placed in an air circulating oven at 60° C. to dry it and then allowed to cool to ambient temperature.

EXAMPLE XIII

Water

| Time(minutes) | Temperature(° C.) |
|---|---|
| 0 | 20.9 |
| 1 | 20.3 |
| 2 | 20.2 |
| 3 | 20.1 |
| 4 | 19.9 |
| 5 | 19.8 |
| 6 | 19.7 |
| 7 | 19.6 |
| 8 | 19.5 |
| 9 | 19.5 |
| 10 | 19.5 |
| 11 | 19.5 |
| 12 | 19.5 |
| 13* | 19.5 |
| 14 | 19.4 |
| 15 | 19.4 |
| 16 | 19.3 |
| 17 | 19.3 |
| 18 | 19.3 |
| 19 | 19.3 |
| 20 | 19.3 |
| 21 | 19.3 |
| 22 | 19.2 |
| 23 | 19.2 |
| 24 | 19.1 |
| 25 | 19.1 |
| 26 | 19.1 |
| 27 | 19.1 |
| 28 | 19.1 |
| 29 | 19.1 |
| 30 | 19.0 |
| 31 | 19.0 |
| 32 | 19.0 |
| 33 | 19.0 |
| 34 | 18.9 |
| 35 | 18.9 |
| 36 | 18.9 |
| 37 | 18.9 |
| 38 | 18.9 |

*Additional water squirted over carbon foam sample.

Figure 15:
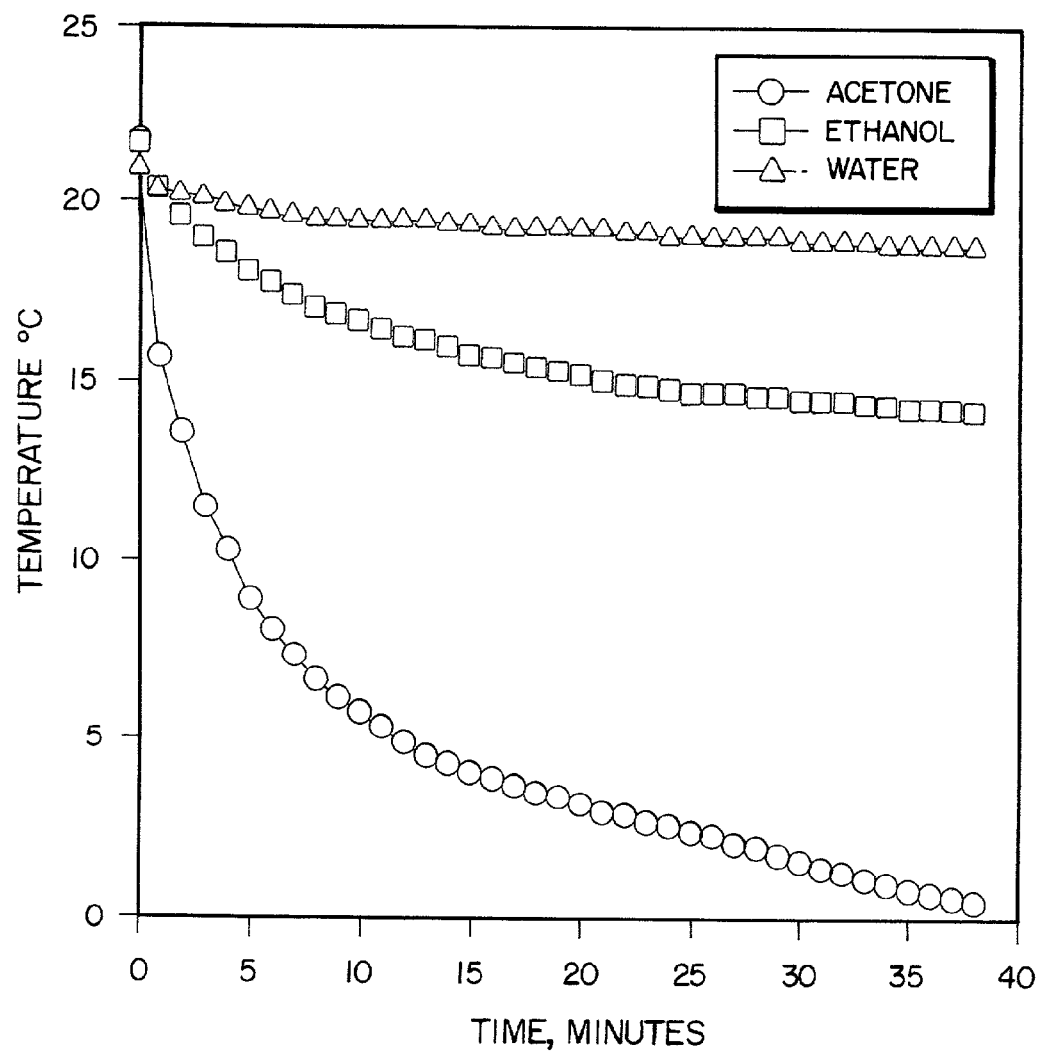

After 38 minutes there was a significant amount of water visible in the bottom of the petri dish. The temperature of the carbon foam plotted as a function of time is shown in FIG. 15. The minimun temperatures are higher for all three working fluids than in the previous Examples where evaporation occurred under vacuum. Moreover, the rate of temperature decrease was much smaller for all three of the working fluid under ambient conditions. The lowest temperature reached (0.5° C.) was attained in 38 minutes with acetone as the working fluid. The lowest temperatures attained over similar time periods were 14.3° C. and 18.9° C. for ethanol and water, respectively.

A third series of tests were conducted to determine the effect on foam temperature of enhanced air flow during the evaporative cooling process. The procedure set forth in the previous Example was followed, except that in this series of experiments a fan (rotary, electric motor driven domestic cooling type) was used to blow ambient air across the foam and petri dish.

EXAMPLE XIV

Acetone with Forced Air Flow

| Time(minutes) | Temperature(° C.) |
|---|---|
| 0 | 21.5 |
| 1 | 5.2 |
| 2 | −0.9 |
| 3 | −2.9 |
| 4 | −2.8 |
| 5 | −3.2 |
| 6 | −3.5 |
| 7 | −3.7 |

Petri dish was frequently replenished with additional acetone

EXAMPLE XV

Ethanol with Forced Air Flow

| Time(minutes) | Temperature(° C.) |
|---|---|
| 0 | 21.1 |
| 1 | 14.6 |
| 2 | 11.5 |
| 3 | 10.8 |
| 4 | 9.7 |

-continued

| Time(minutes) | Temperature(° C.) |
|---|---|
| 5 | 9.3 |
| 6 | 9.1 |
| 7 | 8.9 |
| 8 | 8.7 |
| 9 | 8.8 |
| 10 | 8.9 |

Ethanol in Petri dish replenished once.

EXAMPLE XVI

Water with Forced Air Flow

| Time(minutes) | Temperature(° C.) |
|---|---|
| 0 | 21.1 |
| 1 | 18.7 |
| 2 | 17.1 |
| 3 | 16.5 |
| 4 | 15.9 |
| 5 | 15.6 |
| 6 | 15.3 |
| 7 | 15.1 |
| 8 | 15.0 |
| 9 | 14.9 |
| 10 | 14.8 |
| 11 | 14.8 |
| 12 | 14.7 |
| 13 | 14.7 |
| 14 | 14.7 |
| 15 | 14.6 |

Figure 16:
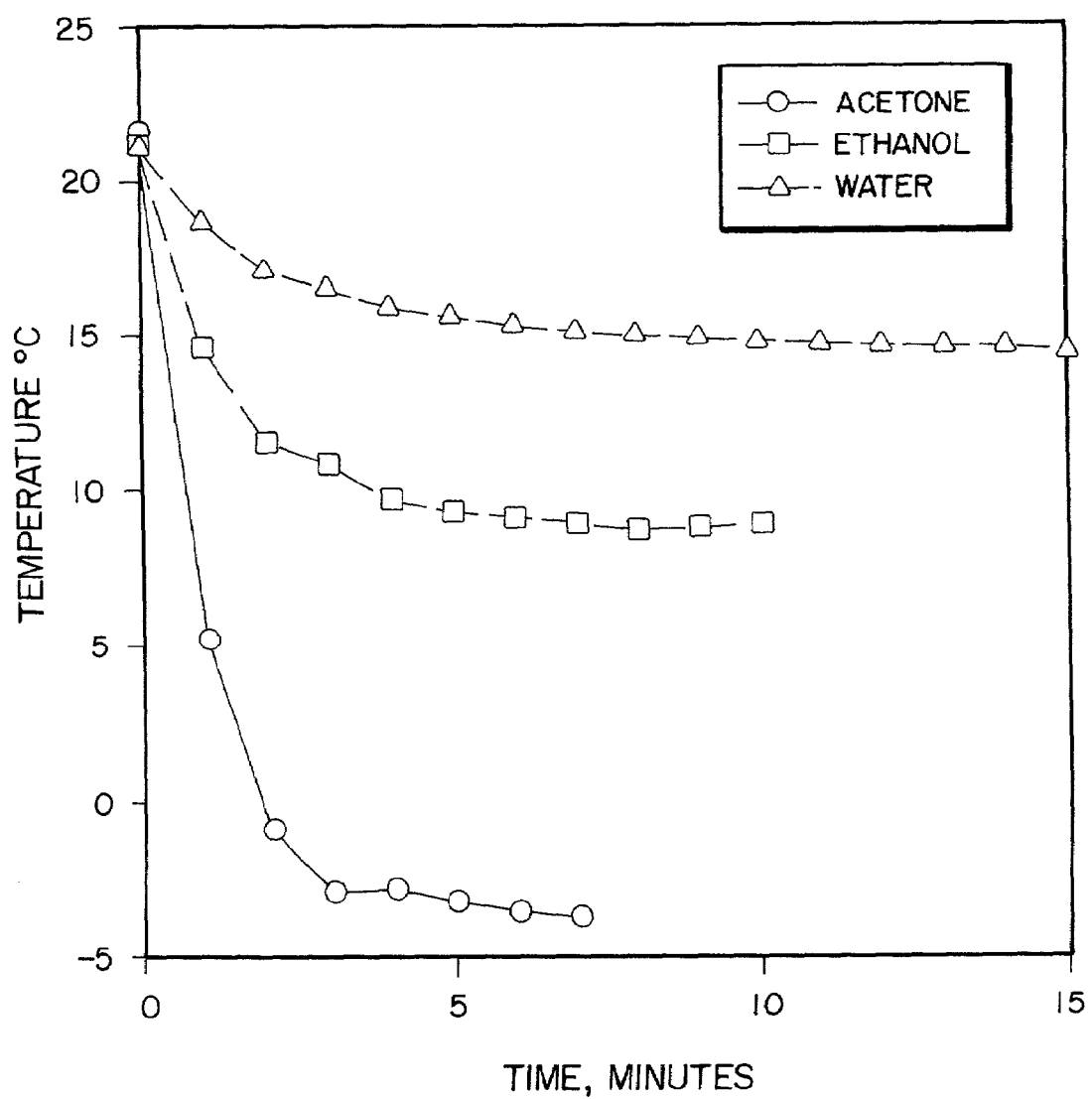

The data from Examples XIV, XV, and XVI are plotted in FIG. 16. An enhanced cooling effect is obtained when air is forced over the evaporating working fluid/carbon foam.

Table I below summarizes the temperature drops (differences) attained for each working fluid under the three sets of conditions employed.

TABLE I

Summary of temperature drop data for the three conditions examined here.

| | Temperature Drop, ° C. | | |
|---|---|---|---|
| Working Fluid | Vacuum | Ambient Pressure and Forced Air Flow | Ambient Pressure |
| Acetone | 66.9 | 25.2 | 21.2 |
| Ethanol | 49.1 | 12.4 | 7.3 |
| Water | 26 | 6.5 | 2.0 |

The temperature drops recorded in the above Table I for a vacuum represent extreme conditions. Lower temperature drops would be attained if intermediate vacuum pressures were used, as indicated by the ambient data. Forced air flow enhanced the cooling effect due to evaporation because the partial pressure of the evaporated solvent over the foam was reduced, and the saturated air was being constantly purged with fresh (unsaturated) air.

These data clearly demonstrate that the carbon foam of this invention readily attains very low temperatures, due to the evaporative cooling effect of the working fluid, which can be used for the removal of unwanted heat. The three example working fluids employed in the Examples were selected because of their availability. An ideal working fluid would have a high latent heat of vaporization, a vaporization temperature close to ambient, be non-toxic and environmentally acceptable.

The foam material of this invention attains low temperatures for several reasons: (i) It is an efficient heat transfer medium because of its excellent thermal conductivity and large surface area; (ii) The working fluid has a high latent heat of vaporization and a low temperature (close to room temperature); (iii) The ambient pressure is low (i.e., a vacuum) causing rapid evaporation from the carbon foam surface.

Figure 17:
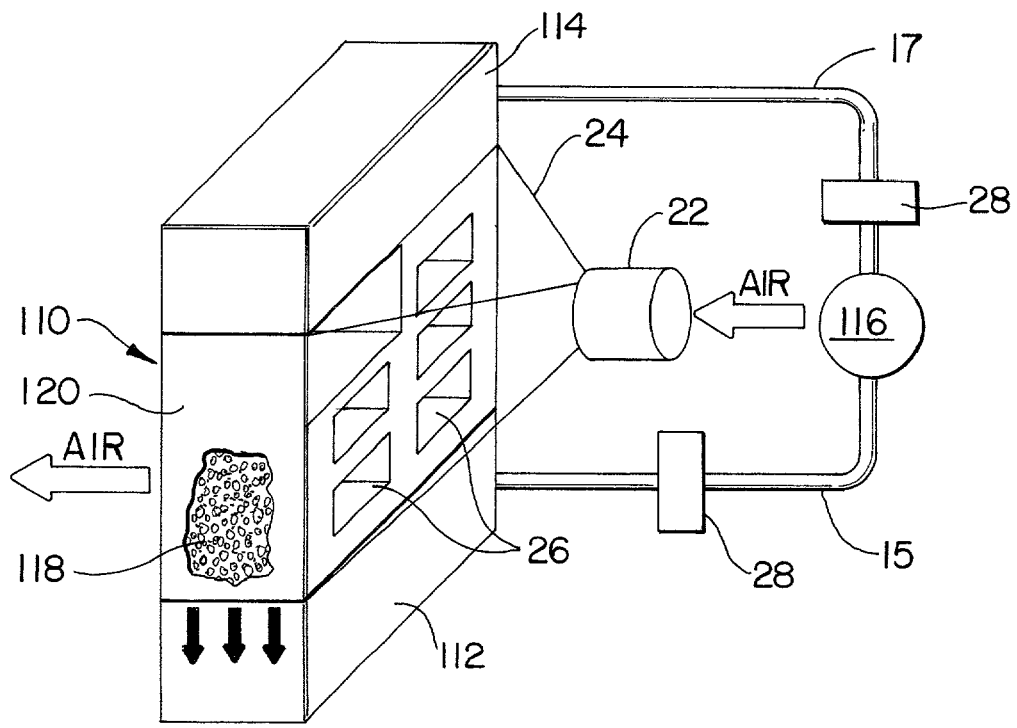
FIG. 17 is a diagrammatic view illustrating one embodiment employing the carbon foam of this invention.

The following are descriptions of preferred embodiments of heat removal systems for different applications that take advantage of the low temperature attained in the foam of this invention through evaporative cooling:

An evaporatively cooled heat sink or air conditioner for home or automobile is illustrated in FIG. 17 generally at 110. A working fluid is pumped from a reservoir 112 to a header tank 114 via pump 116 and lines 15 and 17. It drains through the carbon foam 118 of this invention which is encased in a impermeable coating or skin 120. The downward flow of fluid through the foam 118 occurs under the influence of gravity or a pressure differential created by the pump 116. Evaporation of the working fluid from the carbon foam surface causes cooling of the carbon foam 118. A vacuum in the reservoir 112 created by pump 116 enhances evaporative cooling from the foam 118 and increase the temperature drop, as demonstrated in the previous Examples VII–XVI. A fan with a motor 22 and duct 24 directs a separate air stream (at ambient temperature) from the air used for evaporation through penetrations 26 in the coating or casing 120 and foam core 118 where the air gives up excess heat to the cooled foam core 118. The air therefore exits the foam core 118 at below ambient temperature where it may be ducted to cool inhabited space. Condensers or cold traps 28 may be required to condense vapor exiting the foam core 118. The condensed working fluid is returned to the header tank 114.

Alternatively, instead of air another cooling fluid, such as water, ethylene glycol, helium or nitrogen could be used to remove heat from critical components, such as electronics or chemical/medicines in cold storage, or internal combustion engines.

Figure 18:
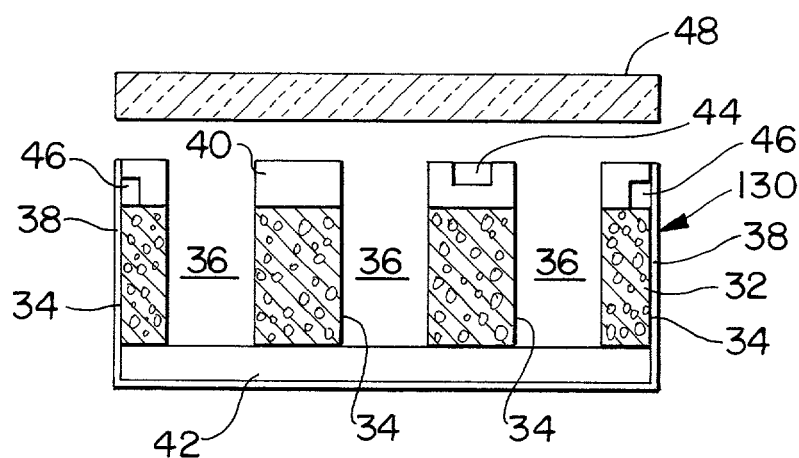
FIG. 18-21 are diagrammatic views illustrating other embodiments employing the carbon foam of this invention.

FIG. 18 shows an evaporatively cooled cold box generally 130. An encapsulated carbon foam core 32 surrounds a series of open cavities 36 into which items to be cooled are placed. The encapsulating skin 38 also provides enclosed cavities 40 and 42 above and below the foam core 32. The working fluid is poured into the top closed cavity 40 such as through opening 44 and drains through the foam 32. Vents 46 are additionally located in the top cavity allowing the working fluid to evaporate to the atmosphere. Evaporation of the working fluid from the carbon foam 32 surface reduces the foam's temperature. Heat for additional working fluid evaporation is extracted from the open cavities 36, thus reducing the temperature within the cavities. The entire cold box is wrapped or clad in the thermal insulation and a thermally insulated lid 48 seals the open (cold storage) cavities. A fan could be fitted to the insulated cold box 130 to increase air flow through the foam and thus increase the evaporation rate of the working fluid.

An evaporatively cooled cold pack could also be made with the carbon foam. It would be somewhat similar to those currently available that are frozen prior to use, and may be fabricated using the carbon foam material. A carbon foam block would be encapsulated with a impermeable material.

The working fluid would be poured in, wet the foam surface and evaporate, causing the foam temperature to drop. An opening through which the working fluid would be poured would also allow the evaporating fluid to vent to atmosphere.

Figure 19:
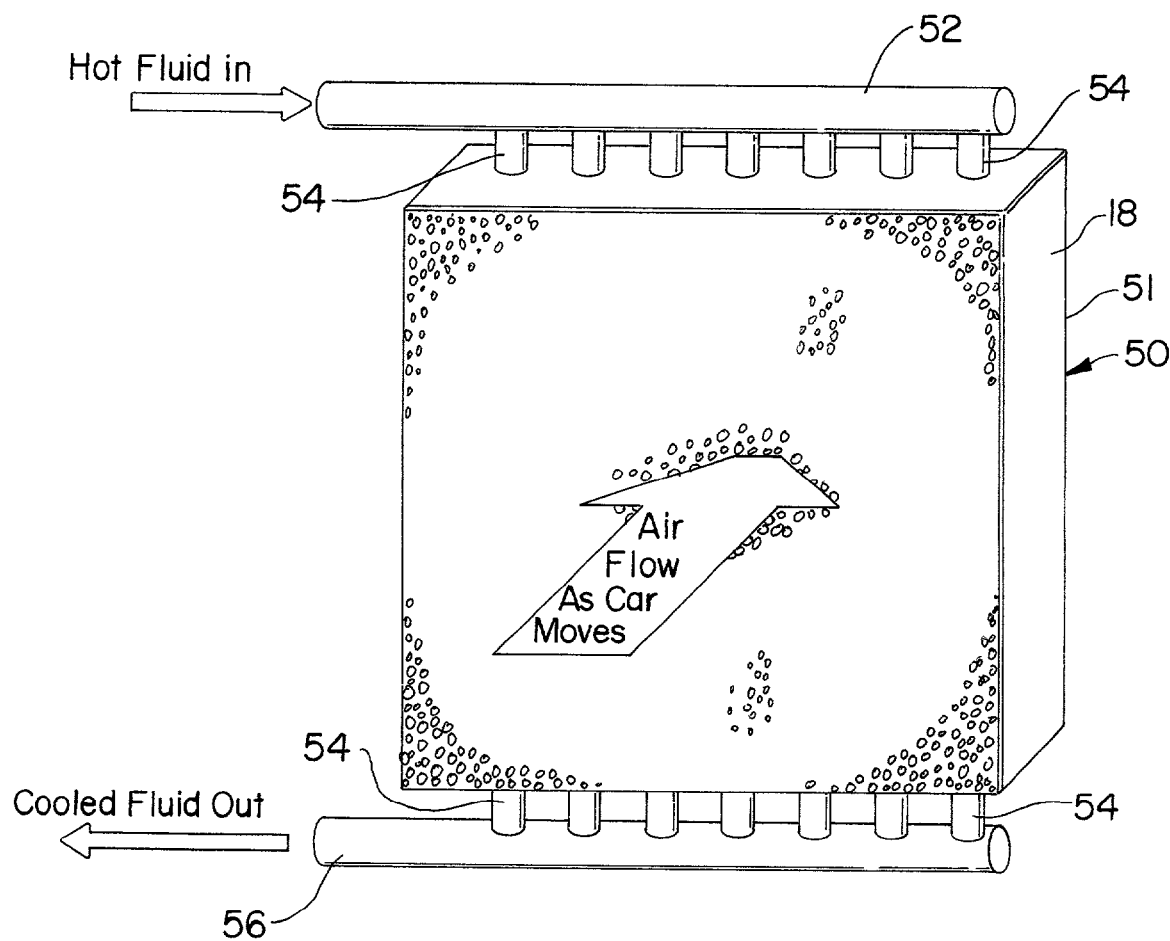
Figure 20:
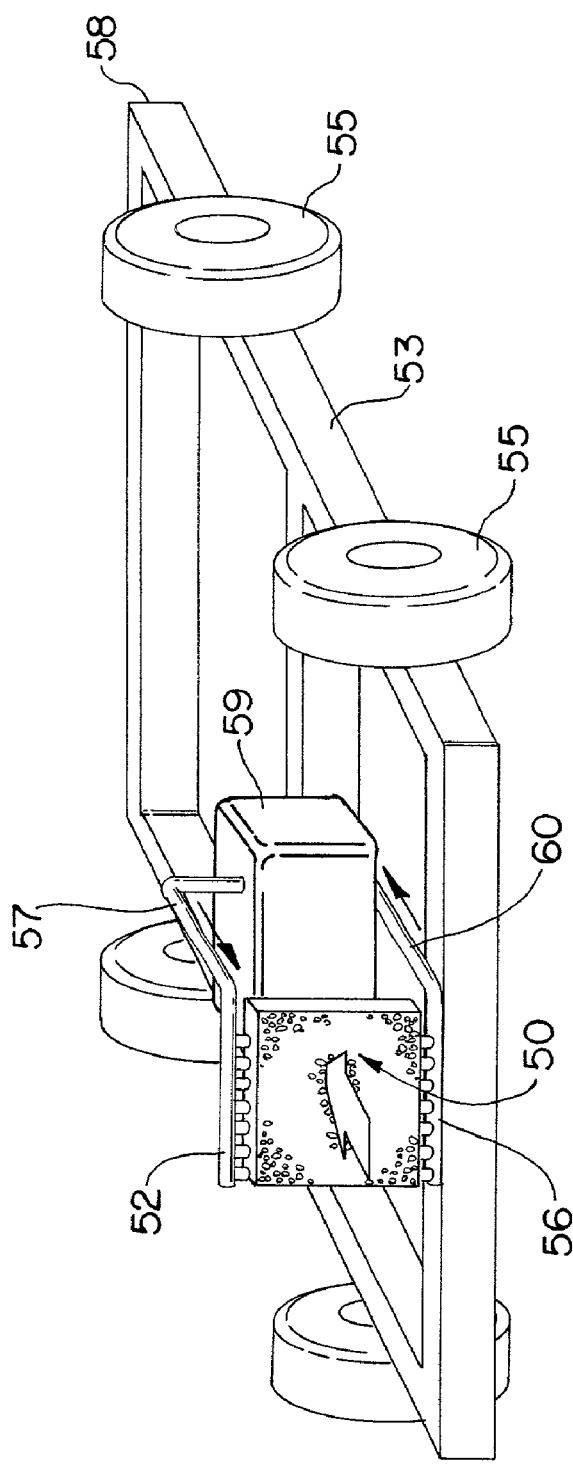

FIG. 19 shows the carbon foam 118 of this invention in the form of a block 51 to be used as an automobile radiator generally 50. Hot engine cooling fluid is introduced into intake manifold 52 connected to pipes 54 which pass through the foam block 51 to the output manifold 56. As seen in FIG. 20 foam block 51 is supported in an automobile as indicated at 58 having the usual frame 53 and wheels 55. Hot fluid is conveyed by output conduit 57 from engine 59 to intake manifold 52. Cooled fluid returns to engine 59 by intake conduit 60 from output manifold 56. As the automobile 58 is moving down the road, air is forced through the foam block 51 and removes the heat to the environment. The efficiency of heat transfer from the radiator 50 to the ambient air is directly related to the surface area of the block 51. Since a foam block 2 feet by 2 feet by 1 inches has approximately 19,000 $m^2$ of surface area while a typical radiator may approach 10 $m^2$, the increased efficiency of the radiator will improve by roughly 3 orders of magnitude.

Figure 21:
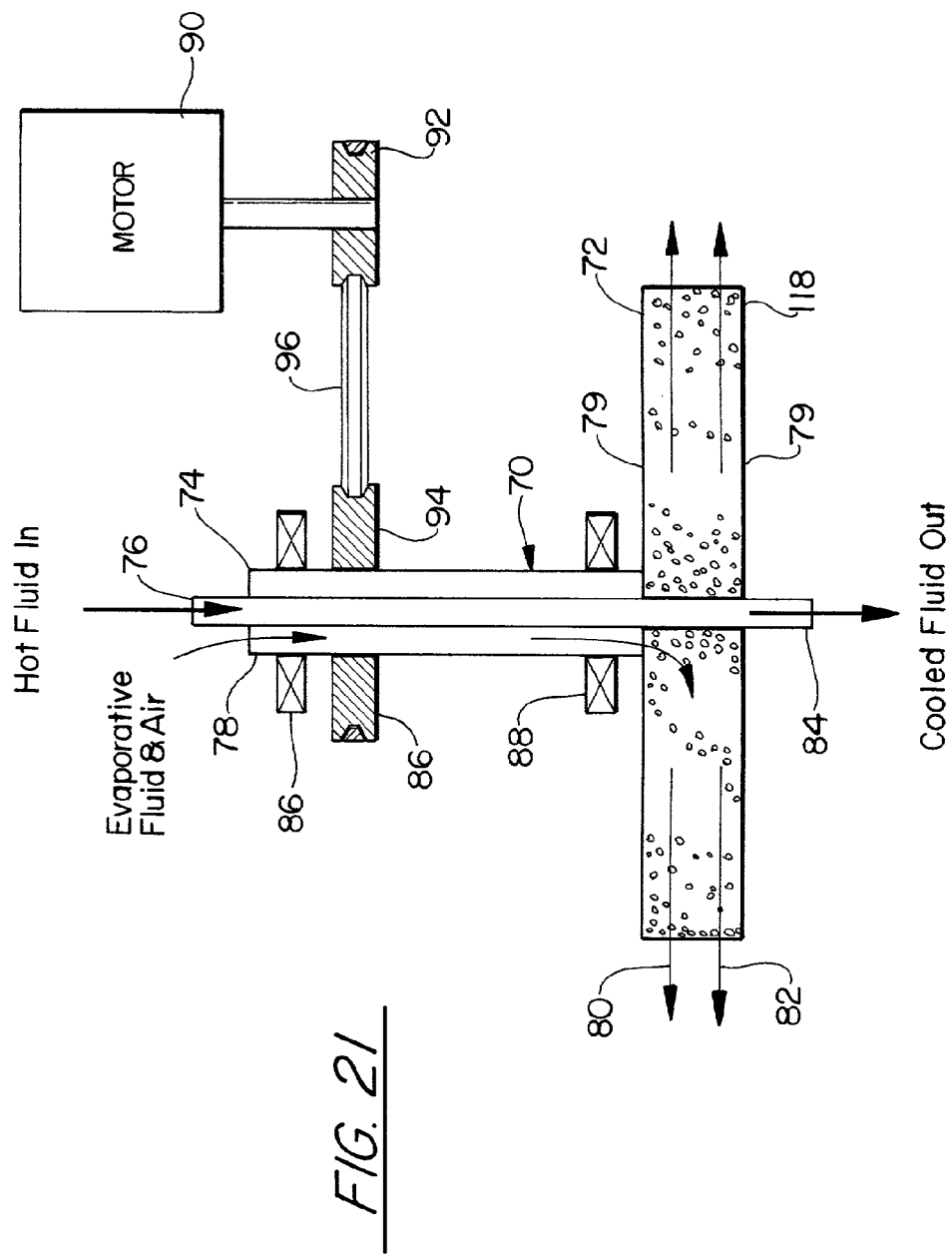

FIG. 21 shows the carbon foam 118 in the form of a spinning disk device generally 70. The disk device includes a foam disk portion 72 connected with a double walled conduit 74 providing a central hollow conduit member 76 and an outer conduit member 78. Air and an evaporative fluid are introduced into conduit 78 where it passes into the foam disk portion 72. The air and evaporative fluid are spun out of the disk portion 72 as it is rotated to the outside of the disk portion 72. This is shown by arrow 80 for the air and arrow 82 for the evaporative liquid. A fluid impermeable coating 79 provides a sealed surface on opposing sides of the disk portion 72. Hot fluid to be cooled is passed down central hollow conduit member 76 where it is cooled in disk portion 72. It flows out the bottom of conduit 76 as indicated at 84. The spinning disk portion 72 is supported by the bearings 86 and 88 in a suitable housing. Rotation of disk portion 72 is effected by motor 90 driving pulleys 92 and 94 by drive belt 96 with pulley 94 connected to conduit 74.

It will thus be seen that through the present invention there is provided:

(i) A carbon foam having a very high thermal conductivity. Large temperature gradients are thus unlikely to develop, and the surface cooling due to evaporation will be quickly translated to bulk material cooling.
(ii) The foam has an extended surface area resulting from its cellular structure. This allows for rapid evaporation of the working fluid.
(iii) The foam has an open structure which allows the working fluid to permeate the material.
(iv) The cell size and ligament properties may be varied, allowing the material to be tailored to the selected working fluid or anticipated cooling application.
(v) A working fluid may be selected that is non-toxic and environmentally acceptable.
(vi) Evaporative cooling systems such as those disclosed herein potentially offers low (zero) energy consumption and increased reliability with few or no moving parts.

Another object of the present invention is the production of a carbon foam heat sink product, i.e., encased high thermal conductivity porous carbon foam filled with a phase change material wherein tremendous amounts of thermal energy are stored and emitted very rapidly. The porous foam is filled with a phase change material (PCM) at a temperature close to the operating temperature of the device. As heat is added to the surface, from a heat source such as a computer chip, friction due to re-entry through the atmosphere, or radiation such as sunlight, it is transmitted rapidly and uniformly throughout the foam and then to the phase change material. As the material changes phase, it absorbs orders of magnitude more energy than non-PCM material due to transfer of the latent heat of fusion or vaporization. Conversely, the filled foam can be utilized to emit energy rapidly when placed in contact with a cold object.

Non-limiting embodiments disclosed herein are a device to rapidly thaw frozen foods or freeze thawed foods, a design to prevent overheating of satellites or store thermal energy as they experience cyclic heating during orbit, and a design to cool leading edges during hypersonic flight or re-entry from space.

In order to illustrate the carbon foam heat sink product of this invention, the following examples are set forth. They are not intended to limit the invention in any way.

EXAMPLE XVII

Device for Thawing Food

Figure 22:
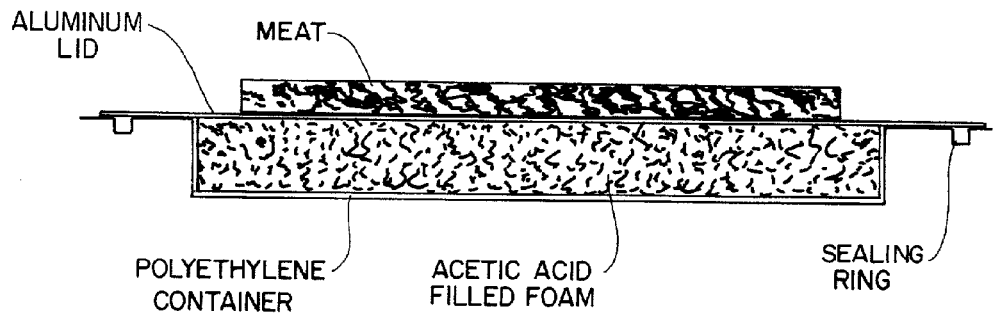
FIG. 22 is section cut of a heat sink device for thawing food using acetic acid as the phase change material.

Acetic acid has a heat of melting of 45 J/g at a melting point of 11° C. The heat of melting of food, primarily ice, is roughly 79 J/g at 0° C. Therefore, take a block of foam and fill it with liquid acetic acid at room temp. The foam will be encased in a box made from an insulating polymer such as polyethylene on all sides except the top. The top of the foam/acetic acid block will be capped with a high thermal conductivity aluminum plate that snaps into place thus sealing the foam/acetic acid inside the polymer case (illustrated in FIG. 22). If the foam block is 10-in.×15-in.×0.5-in. thick, the mass of foam is 614 grams. The mass of acetic acid that fills the foam is roughly 921 grams. Therefore, when a piece of frozen meat is placed in contact with the top of the aluminum block, the foam will cool to the freezing point of the acetic acid (11° C.). At this point, the heat given off from the acetic acid as it freezes (it also remains at 11° C.) will be equivalent to 49 KJ. This heat is rapidly transferred to the frozen meat as it thaws (it also remains at 0° C.). This amount of heat is sufficient to melt roughly 500 grams (1 lb.) of meat.

EXAMPLE XVIII

Heat Sink to Prevent Overheating of Satellites During Cyclic Orbits

Figure 23:
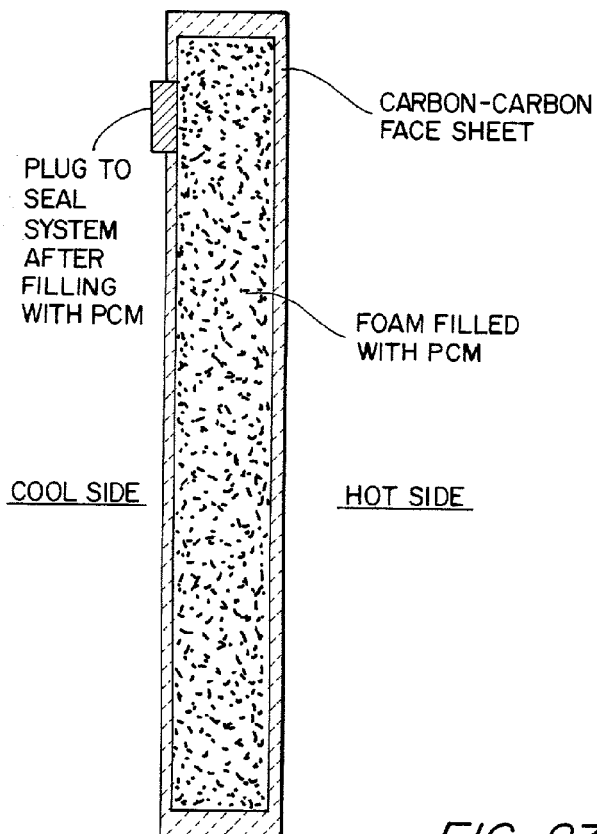
FIG. 23 is a section cut of a heat sink to prevent overheating of satellites during cyclic orbits.
Figure 23:
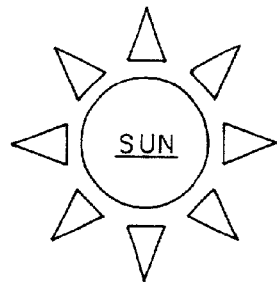

Produce a carbon-carbon composite with the foam in which the foam is a core material with carbon-carbon face sheets (FIG. 23). Fill the foam core with a suitable phase change material, such as a paraffin wax, that melts around the maximum operating temperature of the satellite components. One method to perform this would be to drill a hole in one surface of the carbon-carbon face sheets and vacuum fill the phase change material in the liquid state into the porous foam. Once filled, the sample can be cooled (the phase change material solidifies) and the hole can be plugged with an epoxy or screw-type cap. The epoxy and any other sealant must be able to withstand the operating temperature of the application. The foam-core composite will then be mounted on the side of the satellite that is exposed to the sun during orbit. As the satellite orbits the earth and is exposed to the sun, the radiant energy from the sun will begin to heat the composite panel to the melting point of the phase change material. At this point, the panel will not increase in temperature as the phase change material melts. The amount of radiant energy the panel can absorb will be dependent on the thickness and outer dimensions of the panel. This can be easily calculated and designed through knowledge of the orbit times of the satellite such that the material never completely melts and, thus, never exceeds the melt temperature. Then, when the satellite leaves the view of the sun, it will begin to radiate heat to space and the phase change material will begin to freeze. The cycle will repeat itself once the satellite comes into view of the sun once again.

EXAMPLE XIX

Heat Sink for Leading Edges

Figure 24:
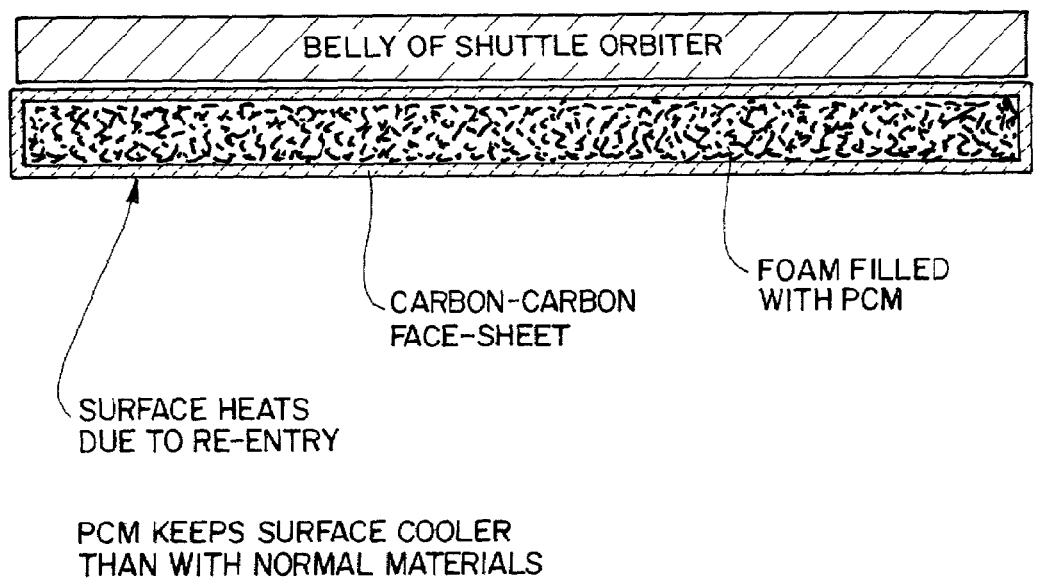
FIG. 24 is a section cut of a heat sink used on the leading edge of a shuttle orbiter.

Currently, the shuttle orbiter experiences extreme heats during reentry. Specifically, the leading edges of the craft can reach 1800° C. and the belly of the craft can reach temperatures as high as 1200° C. If a foam core composite panel is placed at the surface of the leading edges and at the surface of the belly (FIG. 24), it would be able to absorb enough energy to dramatically reduce the maximum temperature of the hot areas. This also would permit a faster re-entry or (steeper glide slope) and maintain the current maximum temperatures. In this case the phase change material would most likely be an alloy, e.g. germanium-silicon, which melts around 800–900 C and does not vaporize until much higher than the maximum temperature of the craft.

For example, Germanium has a heat of formation (heat of melting) of 488 J/g. This would require 1.0 Kg of Germanium to reduce the temperature of 1 Kg of existing carbon/carbon heat-shield by 668° C. In other words, if the existing carbon-carbon were replaced pound-for-pound with germanium filled foam, the maximum temperature of the heat shield would only be about 1131° C. instead of about 1800° C. during re-entry, depending on the duration of thermal loading.

This U.S. patent application incorporates by reference in their entireties the following: U.S. patent application Ser. No. 08/921,875 filed Sep. 2, 1997; U.S. patent application Ser. No. 08/923,877 filed Sep. 2, 1997; U.S. patent application Ser. No. 09/093,406 filed Jun. 8, 1998; and U.S. patent application Ser. No. 09/458,640 filed Dec. 9, 1999; Klett, J., "High Thermal Conductivity, Mesophase Pitch-Derived Graphitic Foam," 43$^{rd}$ Int'l SAMPE Symposium, May 31–Jun. 4, 1998 (Aneheim, Calif.); J. Klett, C. Walls and T. Burchell, "High Thermal Conductivity Mesophase Pitch-Derived Carbon Foams: Effect of Precursor on Structure and Properties," Carbon '99, 24$^{th}$ Biennial Conference on Carbon Jul. 11–16, 1999; J. Klett, "High Thermal Conductivity, Mesophase Pitch-Derived Graphitic Foams," J., Composites in Mfg., 15:4, pp. 1–7 (1999); J. Klett, and T. Burchell, "High Thermal Conductivity, Mesophase Pitch Derived Carbon Foam," Science and Technology of Carbon, Extended Abstracts and Eurocarbon Programme, vol. II, Strasbourg, France, Jul. 5–9, 1998; and pages published at the web site of Poco Graphite, Inc. of Decatur, Tex., at the Internet address poco.com/pocofoam/grafprod, as downloaded on Jan. 21, 2000.

Thermal Conductivity and Specific Thermal Conductivity: The validity of the flash diffusivity method and whether the open porosity would permit penetration of the heat pulse into the sample had to be established. Deep penetration of the pulse in samples typically causes a change in the characteristic heat pulse on the back face of the sample. Thus, errors in the reported diffusivity can be as high as 20%. However, the rather large struts and small openings of the foam limits the depth of penetration to about one to two pore diameters (250–500 micrometers), or less than 2% penetration. Therefore, it was believed that this technique would yield a fairly accurate value for the thermal conductivity. This was confirmed by testing samples with both the flash diffusivity method and the thermal gradient method. The measured conductivities varied by less than 5%, verifying the flash method as a viable method to measure these foams. If the pore structure changes significantly, the flash method will likely yield inaccurate results.

In another embodiment of the invention, two different precursors were used to produce foam with the process of the invention. These precursors were a Conoco Mesophase Pitch and a Mitsubishi ARA24 Mesophase Pitch (herein referred to as Conoco and ARA24). The results are shown in Tables II and III. They were processed with varying operating pressures under nitrogen atmosphere, a heating rate during the foaming step of 3.5° C./min, coked at 630° C. for 1 hour, and cooled at the natural cooling rate of the furnace. The samples were carbonized in a separate furnace under nitrogen at a heating rate of 0.2° C./min up to 1000° C. and then some samples were graphitized at 2800° C. in yet another furnace at two different heating rates (10° C./min and 4° C./min, Table III).

Figure 25:
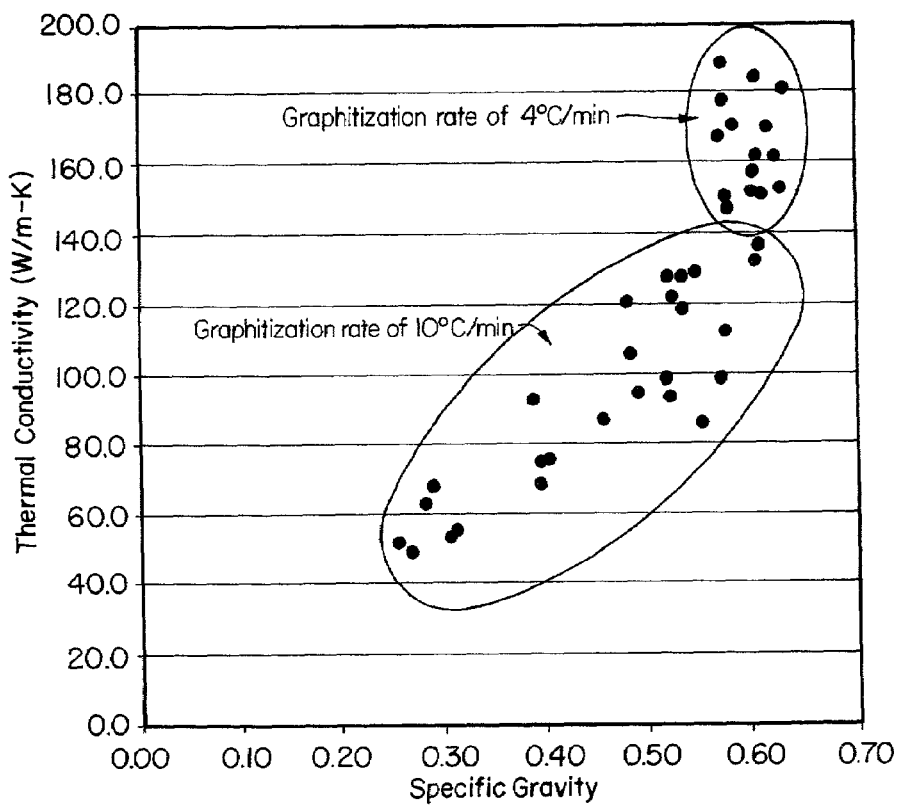
FIG. 25 is a chart plotting the thermal conductivity as a function of density for ARA24 mesophase derived graphite foam graphitized at 4° C./min and 10° C./min.
Figure 26:
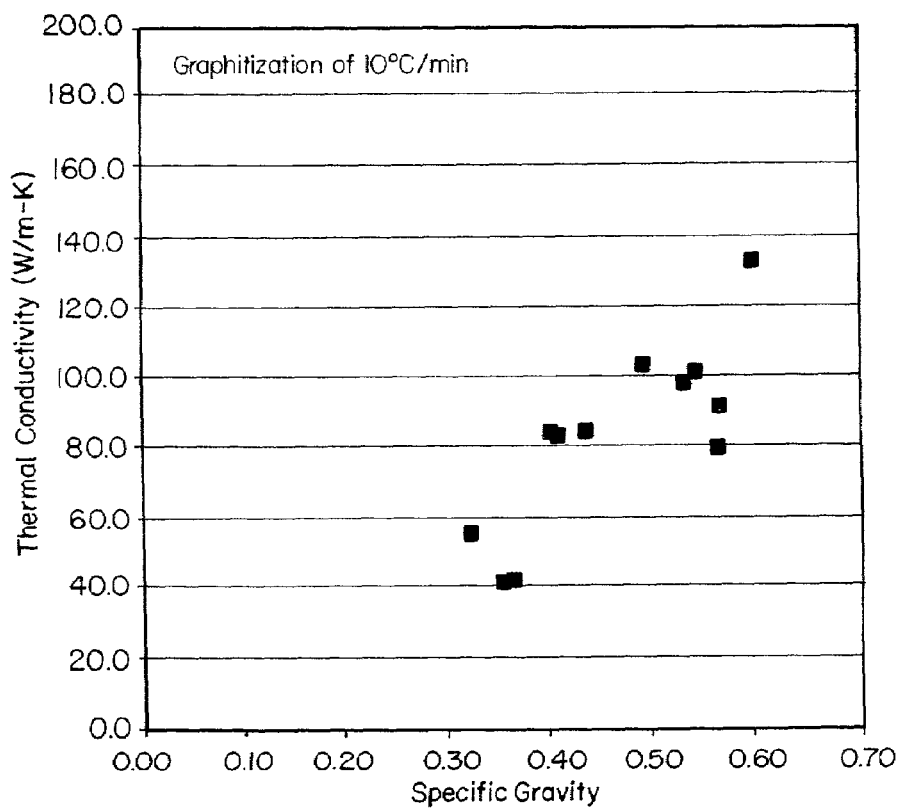
FIG. 26 is a chart plotting the thermal conductivity as a function of density for Conoco mesophase derived graphite foam graphitized at 10° C./min.

The thermal conductivity (a term which is herein used synonymously with "bulk thermal conductivity") of the foam was very high as shown in Table II and FIGS. 25 and 26. The thermal conductivity of the graphitized ARA24 foam, graphitized at 4° C./min, was in the range of approximately 146 to 187 W/m·K, as shown in Table III. This is remarkable for a material with such a low density of approximately 0.56 g/cm$^3$. This calculates as a specific thermal conductivity (thermal conductivity divided by the density) in the range of approximately 256 to 334 W·cm$^3$/m·° K·gm. As stated earlier, for a foam with a bulk thermal conductivity of approximately 58 W/m·K, the ligament thermal conductivity is approximately 700 W/m·K. However, with the data shown in Tables II and III, when the thermal conductivity of the foam is about 147 W/m·K, the ligament thermal conductivity is approximately 1800 W/m·K and for a foam thermal conductivity approximately 187 W/m·K, the ligament thermal conductivity is approximately 2200 W/m·K.

It is an unusual property of the invention that the thermal conductivity of this graphitic carbon foam is substantially isotropic, and is preferably completely isotropic. The foam exhibits substantially isotropic thermal conductivity comparable to the isotropic thermal conductivity of some metallic thermal management materials (Table IV). The foam exhibits a thermal conductivity, 146 to 187 W/m·K for the ARA24 foam in Table III, that is comparable to the in-plane thermal conductivity of other carbon-based thermal management materials, such as the carbon-carbon composites containing carbon fiber that are listed in Table IV, which are 109 W/m·K and 250 W/m·K. The foam has a significantly higher thermal conductivity in the out-of-plane direction than these carbon-carbon composites, which are 1 W/m·K and 20 W/m·K. Carbon-based thermal management materials typically exhibit substantial differences between in-plane and out-of-plane thermal conductivity, as shown in Table IV. Although several of the other thermal management materials have higher in-plane thermal conductivities, their densities are much greater than the foam, i.e., the specific thermal conductivity of the foam is significantly greater than all the available thermal management materials. In fact, the specific thermal conductivity is more than seven times greater than copper (45 W·cm$^3$/m·° K·gm), the preferred material for heat sinks in the prior art. It is clear that, for thermal management, where weight is a concern or where un-steady state conditions occur often, the graphitic foam is superior to most other available materials. The advantage of isotropic thermal and mechanical properties should allow for novel designs that are more flexible and more efficient.

TABLE II

Properties of Carbon Foam Samples of the Invention

| Sample ID | Pitch Precursor | Max Heat Treatment Temperature [° C.] | Foaming Pressure [Psi] | Total Pore Area [$m^2/g$] | Mean Pore Diameter* [microns] | Density [$g/cm^3$] | Specific Surface Area [$m^2/m^3$] | Thermal Conductivity** [W/m K] | Specific Thermal Conductivity [W $cm^3$/m K gm] |
|---|---|---|---|---|---|---|---|---|---|
| G | AR | 1000 | 400 | 61.979 | | 0.22 | 13,635,380 | 0.6 | 2.7 |
| A | AR | 1000 | 600 | 47.89 | 125 | 0.37 | 17,719,300 | 1.2 | 3.2 |
| M | AR | 1000 | 800 | 70.31 | 168 | 0.44 | 30,936,400 | 1.3 | 3.0 |
| P | AR | 1000 | 1000 | 0.036 | 90.7 | 0.54 | 19,440 | 1.7 | 3.1 |
| F | Conoco | 1000 | 400 | 0.956 | 59.44 | 0.33 | 315,480 | 0.9 | 2.7 |
| E | Conoco | 1000 | 600 | 0.166 | 46.93 | 0.4 | 66,400 | 1 | 2.5 |
| D | Conoco | 1000 | 800 | 20.317 | 28.6 | 0.49 | 9,955,330 | 1.3 | 2.7 |
| B | Conoco | 1000 | 1000 | 20.565 | 24 | 0.56 | 11,516,400 | 1.2 | 2.1 |
| N | AR | 2800 | 400 | 0.025 | 340 | 0.25 | 6,250 | 50 | 200.0 |
| K | AR | 2800 | 600 | 112.4 | 165 | 0.39 | 43,836,000 | 72 | 184.6 |
| L | AR | 2800 | 800 | 60.81 | 100.2 | 0.48 | 29,188,800 | 105 | 218.8 |
| O | AR | 2800 | 1000 | 0.045 | 100.85 | 0.57 | 25,650 | 149 | 261.4 |
| Q | AR | 2800 | 1000 | | | 0.57 | | | |
| I | Conoco | 2800 | 400 | 0.087 | 59.19 | 0.35 | 30,450 | 40.8 | 116.6 |
| J | Conoco | 2800 | 600 | 0.162 | 48.45 | 0.4 | 64,800 | 85.1 | 212.8 |
| H | Conoco | 2800 | 800 | 0.15 | 41.23 | 0.49 | 73,500 | 104.2 | 212.7 |
| C | Conoco | 2800 | 1000 | 27.06 | 31.3 | 0.59 | 15,965,400 | 134.1 | 227.3 |

*note: The mean pore diameter, since it was calculated from results by mercury ponsimetry, is not representative of average cell size.
**note: Thermal conductivity was calculated from the measured thermal diffusivity using a xenon pulse flash diffusivity technique.

TABLE III

Thermal Conductivity and Specific Thermal Conductivity vs. Density for Mesophase Derived Graphite Foams Made from Different Precursors in the Invention.

| Density [$g/cm^3$] | Thermal Conductivity [W/m-K] | *Specific Thermal Conductivity [W-$cm^3$/m-K-gm] | Graphitization Rate [° C./min] | Density [$g/cm^3$] | Thermal Conductivity [W/m-K] | *Specific Thermal Conductivity [W-$cm^3$/m-K-gm] | Graphitization Rate [° C./min] |
|---|---|---|---|---|---|---|---|
| Conoco | | | | ARA24 | | | |
| 0.59 | 134.1 | 227 | 10 | 0.56 | 187 | 334 | 4 |
| 0.56 | 92.1 | 164 | 10 | 0.59 | 183 | 310 | 4 |
| 0.56 | 80.1 | 143 | 10 | 0.62 | 180 | 290 | 4 |
| 0.54 | 102 | 189 | 10 | 0.56 | 177 | 316 | 4 |
| 0.53 | 99 | 187 | 10 | 0.58 | 170 | 293 | 4 |
| 0.49 | 104.2 | 213 | 10 | 0.61 | 169 | 277 | 4 |
| 0.43 | 85.2 | 198 | 10 | 0.56 | 166 | 296 | 4 |
| 0.4 | 84.1 | 210 | 10 | 0.56 | 165 | 295 | 4 |
| 0.4 | 85.1 | 213 | 10 | 0.6 | 161 | 268 | 4 |
| 0.32 | 55.1 | 172 | 10 | 0.61 | 160 | 262 | 4 |
| 0.36 | 40.9 | 114 | 10 | 0.59 | 157 | 266 | 4 |
| 0.35 | 40.8 | 117 | 10 | 0.62 | 152 | 245 | 4 |
| | | | | 0.59 | 151.2 | 256 | 4 |
| | | | | 0.6 | 150 | 250 | 4 |
| | | | | 0.57 | 148.9 | 261 | 4 |
| | | | | 0.57 | 146 | 256 | 4 |
| ARA24 | | | | | | | |
| 0.6 | 136 | 227 | 10 | 0.52 | 93 | 179 | 10 |
| 0.6 | 131.6 | 219 | 10 | 0.38 | 92.2 | 243 | 10 |
| 0.51 | 127 | 249 | 10 | 0.45 | 86.8 | 193 | 10 |
| 0.53 | 127 | 240 | 10 | 0.55 | 85.3 | 155 | 10 |
| 0.52 | 121 | 233 | 10 | 0.4 | 75 | 188 | 10 |
| 0.47 | 119.6 | 254 | 10 | 0.39 | 74.5 | 191 | 10 |
| 0.53 | 118 | 223 | 10 | 0.39 | 68.2 | 175 | 10 |
| 0.57 | 112 | 196 | 10 | 0.29 | 67.1 | 231 | 10 |
| 0.48 | 105.3 | 219 | 10 | 0.28 | 62 | 221 | 10 |
| 0.48 | 104.5 | 218 | 10 | 0.31 | 55.2 | 178 | 10 |
| 0.57 | 98 | 172 | 10 | 0.3 | 52.6 | 175 | 10 |
| 0.51 | 98 | 192 | 10 | 0.25 | 50.5 | 202 | 10 |
| 0.49 | 94 | 192 | 10 | 0.27 | 48.3 | 179 | 10 |

*Specific Thermal Conductivity = Thermal Conductivity divided by Density.

TABLE IV

| Material | Density [gm/cm³] | Thermal Conductivity | | Specific Thermal Conductivity | |
|---|---|---|---|---|---|
| | | In-plane [W/m·K] | Out-of-plane [W/m·K] | In-plane [W·cm³/m·°K·gm] | Out-of-plane [W·cm³/m·°K·gm] |
| Typical 2-D Carbon-Carbon | 1.88 | 250 | 20 | 132 | 10.6 |
| EWC-300/Cyanate Ester | 1.172 | 109 | 1 | 63 | 0.6 |
| Copper | 8.9 | 400 | 400 | 45 | 45 |
| Aluminum 6061 | 2.8 | 180 | 180 | 64 | 64 |
| Aluminum Honeycomb | 0.19 | — | ~10 | — | 52 |
| Aluminum Foam | 0.5 | 12 | 12 | 24 | 24 |

Based on the data in Tables II, III, and IV and in FIGS. 25 and 26, it can be seen that the carbon foams of the invention, when graphitized, have surprisingly high thermal conductivity and specific thermal conductivity. The graphitic carbon foams typically have a thermal conductivity of at least 40 W/m·°K and/or a specific thermal conductivity at least equal to copper, i.e., at least 45 W·cm³/m·°K·gm, and usually on the order of at least 75 W·cm³/m·°K·gm. More typical graphitic carbon foams of the invention have a thermal conductivity of at least 75 W/m·°K and/or a specific thermal conductivity of at least 100 W·cm³/m·°K·gm. In the preferred embodiment, the carbon foams of the invention have a thermal conductivity of at least 100 W/m·°K and/or a specific thermal conductivity of at least 150 W·cm³/m·°K·gm. More preferred embodiments contemplate carbon foams having a thermal conductivity of at least 125 W/m·°K and/or a specific thermal conductivity of at least 175 W·cm³/m·°K·gm. Yet more preferred embodiments contemplate carbon foams having a thermal conductivity of at least 150 W/m·°K and/or a specific thermal conductivity of at least 200 W·cm³/m·°K·gm. Still more highly preferred embodiments contemplate carbon foams having a thermal conductivity of at least 175 W/m·°K and/or a specific thermal conductivity of at least 250 W·cm³/m·°K·gm, with the data in Tables II–IV and FIGS. 25 and 26 showing that specific thermal conductivities on the order of at least 275 W·cm³/m·°K·gm, and even at least 300 W·cm³/m·°K·gm, and indeed even at least 325 W·cm³/m·°K·gm, are attainable. Pore diameters indicated in Table II were measured by the mercury porisimetry method.

Specific Surface Area, Another property that affects the overall thermal performance of the carbon foam is the specific surface area (SSA), calculated by:

$$SSA[m^2/m^3] = \text{Total Pore Area } [m^2/g] \times \text{Density } [g/cm^3] \times 1{,}000{,}000 [cm^3/m^3]$$

Smaller specific surface areas indicate a lower foam porosity which reduces the effect of the natural convective heat transfer mode (laminar flow) and allows the more efficient conductive heat transfer mode to dominate thermal performance. Larger SSA's enhance evaporative cooling via increased surface area to volume ratio and increasing the contact area between the evaporative fluid and the foam material. SSA is also an indicator of the foam's response to forced convective heat transfer (turbulent flow) via fluid passing through the media by increasing the surface area used for heat transfer.

As shown in Table II, the SSA value for the graphitized carbon foams of the invention (heat treated to 2800° C.) was at least about 6,000 m²/m³, typically above 25,000 m²/m³, and even more typically above 65,000 m²/m³. SSA values of at least 100,000 m²/m³ or at least 500,000 m²/m³ are contemplated in the invention. Indeed, several samples shown in Table II were above 1,000,000 m²/m³, and in the preferred embodiment, the carbon foam has an SSA of at least about 2,000,000 m²/m³, more preferably at least about 5,000,000 m²/m³, more preferably still at least about 10,000,000 m²/m³, and most preferably, at least about 15,000,000 m²/m³, with SSA values of at least about 25,000,000 m²/m³ or at least about 35,000,000 also being contemplated. The upper possible limit on the SSA value is currently unknown, and while the data in Table II show the highest value achieved with the few samples therein tested as 43,836,000 m²/m³, values both higher or lower than this value are contemplated as within the invention.

Evaporative Cooling: Examples VII, VIII, and X, along with FIG. 14 show that the still air experiments in a vacuum furnace produced the following cooling rates:

I. Using acetone as the fluid, the carbon foam temperature reached −53.4° C. (C) in no more than about 4 minutes;

II. Using ethanol as the fluid, the carbon foam temperature reached −28.6° C. in no more than about 6 minutes;

III. Using water as the fluid, the carbon foam temperature reached −5.5° C. in no more than about 3 minutes.

Examples XI, XII, and XIII, along with FIG. 15, show that the natural convection experiments conducted under ambient room temperature conditions produced the following cooling rates:

I. Using acetone as the fluid, the carbon foam temperature reached 0.5° C. in no more than 38 minutes;

II. Using ethanol as the fluid, the carbon foam temperature reached 14.3° C. in no more than 38 minutes; and III. Using water as the fluid, the carbon foam temperature reached 18.9° C. in no more than 38 minutes.

As indicated above, the foregoing information was derived from the data presented with respect to the experiments previously described showing decreases in temperature with time using acetone, ethanol, and water, respectively. But these are by no means the only conclusions that can be drawn from the tabular data set forth for these experiments. For example, in Example VII it is shown, under the conditions of the experiment, that, when acetone was the fluid, the carbon foam reached a temperature of −46.7° C. in no more than 2 minutes at a reduced pressure (vacuum) of 29 torr. Similarly, in Experiment VIII it is shown, under the conditions of the experiment, that, when ethanol was the fluid, the carbon foam reached a temperature of −21.7° C. in no more than 3 minutes at a reduced pressure (vacuum) of 1.2 torr. And again similarly, in Experiment XI, with acetone as a fluid, and under the natural convection conditions of the experiment, the carbon foam reached a temperature of 5.7° C. in no more than 10 minutes. These and similar conclusions may be drawn from the tabular data in Examples VII to XVI, which data illustrate the combined effects the high thermal conductivity and SSA properties of the carbon foam of the invention have upon the cooling rate achievable with acetone, ethanol, and water, respectively.

X-ray Analysis: Lattice parameters were determined from the indexed diffraction peak positions (Table V). The X-ray method for crystallite size determination is well known to those skilled in the art. The 002 and 100 diffraction peak breadths were analyzed using the Scherrer equation to determine the crystallite dimensions in the a- and c-directions.

$$t = \frac{0.9\lambda}{B\cos(2\theta)}$$

where t is the crystallite size, λ is the X-ray wavelength, B is the breadth of the diffraction peak [full width half maximum (FWHM) minus the instrumental breadth], and 2 θ is the diffraction angle. As shown in Table V, the 002 peak (which is characteristic of interlayer spacing), was very narrow and asymmetric, indicative of highly ordered graphite. The interlayer spacing calculated with the Scherrer method is in the range of approximately 0.3354 nm to 0.3364 nm. The crystallite size in the c-direction was calculated from these data to be at least approximately 82.4 nm, and the 100 peak (or 1010 in hexagonal nomenclature) was used to calculate the crystallite size in the a-direction of at least approximately 21.5 nm. These crystallite sizes are larger than typical high thermal conductivity carbon fibers and therefore, the foam ligaments should perform similarly to high order pyrolytic carbon and high thermal conductivity carbon fibers such as K1100 and vapor grown carbon fibers (VGCF).

structure is significantly different from typical vitreous carbon foams: vitreous carbon foams are void of graphitic structure, have large openings and linear ligaments, and are mostly pentagonal dodcahedral in shape.

Moreover, it can be seen that in the junctions 220 between ligaments, the graphitic structure is less aligned and possesses more folded texture. It is postulated that this arises from the lack of stresses at this location during forming. Therefore, the well-ordered structure in these regions is primarily an artifact of the structure in precursor mesophase prior to heat treatment.

We claim:

1. A process for producing a thermally conductive carbon foam, comprising:
    (1) liquefying a synthetic or mesophase pitch;
    (2) heating the liquefied pitch under non-oxidizing, superatmospheric conditions to produce a carbon foam;
    (3) coking said carbon foam by heating said carbon foam under non-oxidizing, superatmospheric conditions;
    (4) carbonizing the carbon foam by heating in a non-oxidizing environment at a temperature higher than that for coking in step (3), and

TABLE V

X-ray Diffraction Data for Carbon Foam Samples

| *Sample ID | Pitch Precursor | Max Heat Treatment Temperature [° C.] | Foaming Pressure [Psi] | $d_{002}$ spacing [nm] | La [nm] | Lc [nm] | Peak Angles (2θ) 002 | 101 | 100 | FWHM 002 | 101 | 100 | Narrowness Relative Peak Split Factor (RPSF) |
|---|---|---|---|---|---|---|---|---|---|---|---|---|---|
| original | AR | 1000 | 1000 | 0.3362 | 20.3 | 44.2 | 26.4853 | 42.3185 | 44.2751 | 0.2940 | 0.5540 | 1.2870 | 0.470 |
| N | AR | 2800 | 400 | 0.3364 | 11.8 | 48.2 | 26.4769 | 42.1512 | 44.1507 | 0.2292 | 0.7644 | 0.8856 | 0.413 |
| K | AR | 2800 | 600 | 0.3362 | 17.8 | 46.6 | 26.4839 | 42.0911 | 44.2000 | 0.2348 | 0.5374 | 0.7207 | 0.298 |
| L | AR | 2800 | 800 | 0.3360 | 21.5 | 79.3 | 26.5006 | 42.1416 | 44.2069 | 0.1628 | 0.4542 | 0.7807 | 0.299 |
| O | AR | 2800 | 1000 | 0.3356 | 21.4 | 56.7 | 26.5540 | 42.2270 | 44.2815 | 0.1590 | 0.5220 | 0.7438 | 0.308 |
| Q | AR | 2800 | 1000 | 0.3354 | 18.4 | 82.4 | 26.5383 | 42.3065 | 44.2815 | 0.2040 | 0.4568 | 0.7438 | 0.304 |

*Samples N–Q of Table V are the same as samples N–Q of Table II, respectively.

The "doublet" at the 100 and 101 peaks is characterized by a relative peak split factor (RPSF) parameter, or narrowness, calculated using the peak angles and the full width half maximums (FWHM). The equation is:

$$*RPSF = \frac{\left(\frac{FWHM_{101}}{2} + \frac{FWHM_{100}}{2}\right)}{2\theta_{100} - 2\theta_{101}}$$

A smaller RPSF indicates closer peaks at 100 and 101 and favorable lattice conditions for thermal conductivity and structural integrity. The data reported in Table V shows values for RPSF no greater than 0.470, with the lowest reported value for a carbon foam heat treated at 2800" C being 0.298 and the highest being 0.413.

Figure 27:
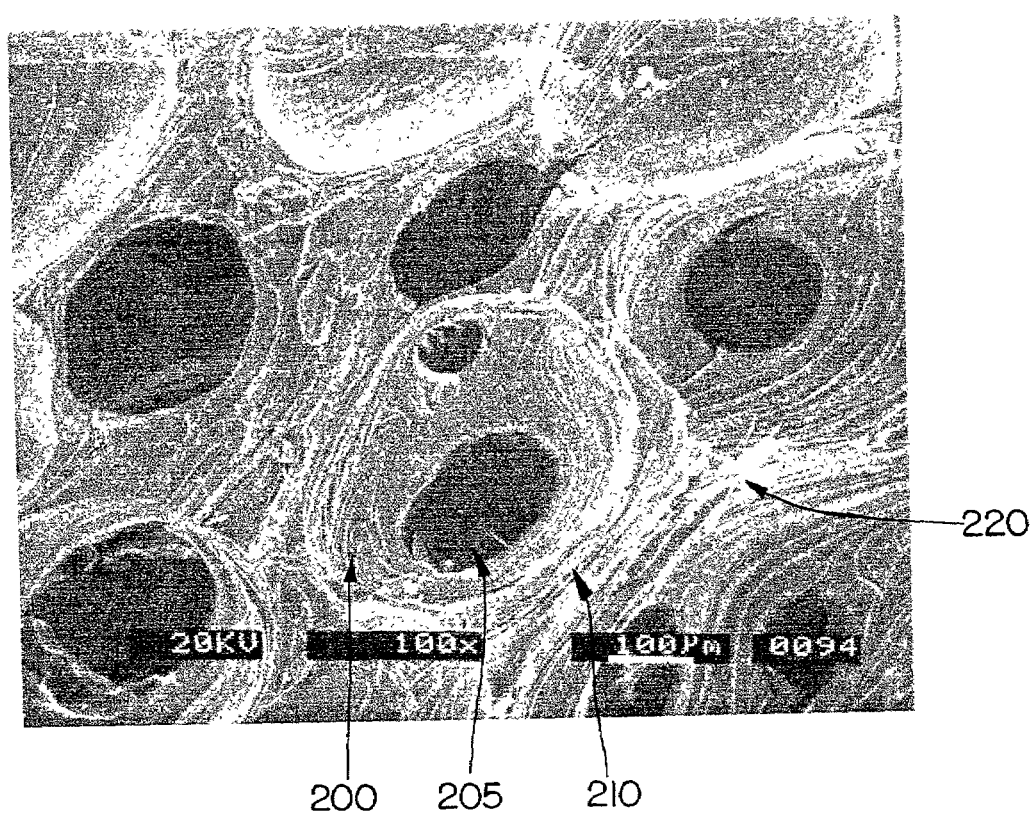
FIG. 27 is a photograph taken by SEM imaging of a sample of the carbon foam of the invention.
Figure 28:
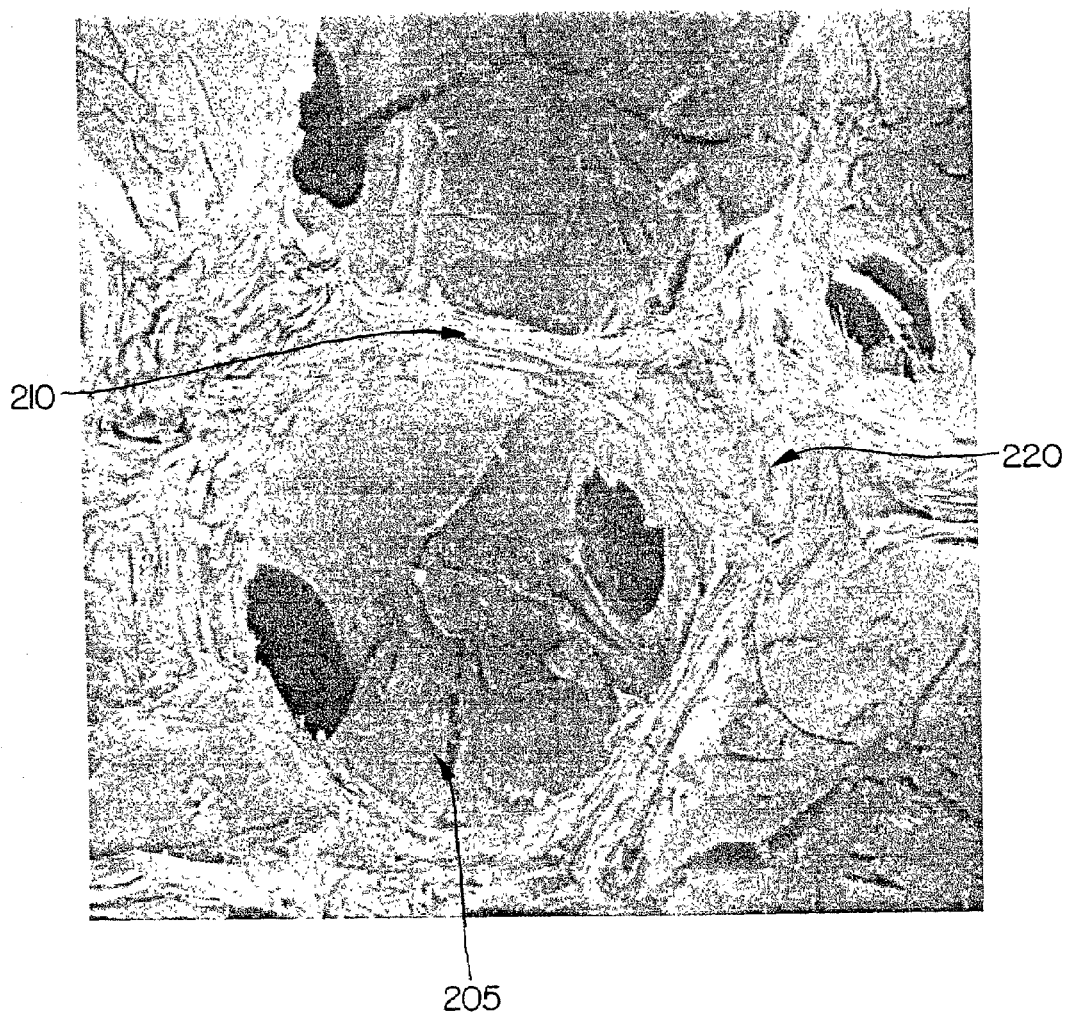
FIG. 28 is a photograph taken by SEM imaging of a sample of the carbon foam of the invention illustrating the open interconnects between cells and showing how the interconnect diameter is about half that of the cell diameter, typically on the order of 40% to 60% of the cell diameter.

Microstructural Characterization: FIGS. 27 and 28 are scanning electron micrographs of the pore structure of a foam sample of the invention. The foam exhibits a structure having open interconnects 205 between cells (or pores) 200, with such cells (or pores) being of similar geometric shape, typically ellipsoidal, and sometimes spherical or essentially spherical. (It is noted that a sphere is a specific form of an ellipsoid.) It is evident from the images that the graphitic structure is oriented parallel to the cell walls and highly aligned along the axis of ligaments 210. This highly aligned (5) further heating at a yet higher temperature to yield a graphitic carbon foam, wherein after coking step (3), said heatings are performed without oxidatively stabilizing the carbon foam.

2. The process of claim 1 wherein the pitch is liquified in step (1) by heating under non-oxidizing conditions including a pressure lower than the superatmospheric pressure producing the carbon foam in step (2).

3. The process of claim 1 wherein the pressure of said superatmospheric conditions producing said carbon foam in step (2) is less than about 69 atm (1000 psi).

4. The process of claim 1 wherein the heating in step (2) is carried out under a static superatmospheric pressure.

5. The process of claim 1 wherein said heating in step (2) is carried out at a temperature no greater than about 480° C.

6. The process of claim 1 wherein, said heating of the liquified pitch under non-oxidizing, superatmospheric conditions in step (2) comprises heating at a temperature between about 420° C. and about 480° C.

7. The process of claim 6 wherein the heating in step (2) is carried out such that at least some foaming occurs at said temperature between about 420° C. and about 480° C.

8. The process of claim 1 wherein the heating in step (2) is carried out with no release of pressure until the formation of the carbon foam is substantially complete.

9. The process of claim 1 wherein said heating in step (3) is carried out at a temperature above 500° C.

10. The process of claim 1 wherein the temperature in step (3) is held constant for at least 15 minutes.

11. The process of claim 1 wherein the pressure is held substantially constant during each of steps (2) and (3).

12. The process of claim 1 wherein the pressure in steps (2) and (3) is identical.

13. The process of 1 wherein the temperature during coking in step (3) is no more than 1000° C.

14. The process of claim 1 wherein the coked foam is cooled prior to being carbonized in step (4).

15. The process of claim 1 wherein the pressure in steps (2) and (3) is substantially identical.

16. The process of claim 1 wherein said thermal conductivity is at least 40 W/m·K.

17. The process of claim 1, wherein said thermal conductivity is between 40 W/m·K and 187 W/m·K.

18. The process of claim 1, wherein said thermal conductivity is between 75 W/m·K and 187 W/m·K.

19. The process of claim 1, wherein said thermal conductivity is between 100 W/m·K and 187 W/m·K.

\* \* \* \* \*